(12) United States Patent
Young et al.

(10) Patent No.: US 12,431,038 B2
(45) Date of Patent: Sep. 30, 2025

(54) SYSTEM AND METHOD FOR SPORTS SOCIAL MEDIA APPLICATION

(71) Applicant: BALLOGY, INC., Austin, TX (US)

(72) Inventors: Todd Young, Austin, TX (US); Zach Urbanus, Austin, TX (US)

(73) Assignee: Ballogy, Inc., Austin, TX (US)

( * ) Notice: Subject to any disclaimer, the term of this patent is extended or adjusted under 35 U.S.C. 154(b) by 691 days.

(21) Appl. No.: 16/557,567

(22) Filed: Aug. 30, 2019

(65) Prior Publication Data

US 2019/0385477 A1     Dec. 19, 2019

Related U.S. Application Data

(63) Continuation-in-part of application No. 16/159,436, filed on Oct. 12, 2018.

(60) Provisional application No. 62/729,232, filed on Sep. 10, 2018, provisional application No. 62/571,724, filed on Oct. 12, 2017.

(51) Int. Cl.
| | |
|---|---|
| A63B 71/06 | (2006.01) |
| G06N 3/04 | (2023.01) |
| G06N 3/044 | (2023.01) |
| G09B 19/00 | (2006.01) |
| H04L 29/08 | (2006.01) |
| H04L 67/53 | (2022.01) |
| G06N 3/08 | (2023.01) |

(52) U.S. Cl.
CPC ...... *G09B 19/0038* (2013.01); *A63B 71/0622* (2013.01); *G06N 3/044* (2023.01); *H04L 67/53* (2022.05); *A63B 2071/063* (2013.01); *A63B 2071/0694* (2013.01); *A63B 2220/803* (2013.01); *A63B 2220/806* (2013.01); *A63B 2220/808* (2013.01); *G06N 3/08* (2013.01)

(58) Field of Classification Search
CPC . G09B 19/0038; H04L 67/20; A63B 71/0622; A63B 2220/803; A63B 2220/808; A63B 2071/063; A63B 2071/0694; A63B 2220/806; G06N 3/0445; G06N 3/08
See application file for complete search history.

(56) References Cited

U.S. PATENT DOCUMENTS

| | | | |
|---|---|---|---|
| 7,092,846 B2 | 8/2006 | Vock et al. | |
| 9,381,420 B2 | 7/2016 | Burroughs | |
| 9,914,035 B2 * | 3/2018 | Campbell | ............ A63B 71/022 |

(Continued)

FOREIGN PATENT DOCUMENTS

| | | |
|---|---|---|
| EP | 3694616 A1 | 8/2020 |
| WO | WO2019075401 A1 | 4/2019 |

OTHER PUBLICATIONS

"Analysis of Basketball Games Using Neural Networks"—Ivankovic et al, 2010 International Symposium on Computational Intelligence and Informatics, Nov. 20, 2010 https://ieeexplore.ieee.org/document/5672237 (Year: 2010).*

(Continued)

*Primary Examiner* — Randy A Scott
(74) *Attorney, Agent, or Firm* — Berkeley Law & Technology Group, LLP

(57) ABSTRACT

A method includes selecting a test, by a computer using a sports social media application. The method also includes selecting a user and sending, by the computer using the social media sports application, test data associated with the test to a device associated with the user.

18 Claims, 14 Drawing Sheets

(56) References Cited

U.S. PATENT DOCUMENTS

| | | | |
|---|---|---|---|
| 11,577,139 | B1* | 2/2023 | Campbell ............ A63B 69/407 |
| 11,839,805 | B2 | 12/2023 | Young et al. |
| 12,370,429 | B2 | 7/2025 | Young |
| 2008/0015061 | A1* | 1/2008 | Klein ................ G09B 19/0038 473/447 |
| 2008/0312010 | A1 | 12/2008 | Marty |
| 2009/0048044 | A1 | 2/2009 | Oleson et al. |
| 2009/0099924 | A1* | 4/2009 | Lensch ............. G06Q 30/0211 705/26.1 |
| 2012/0041767 | A1* | 2/2012 | Hoffman ................ G06Q 50/20 482/8 |
| 2013/0095959 | A1 | 4/2013 | Marty |
| 2013/0286004 | A1 | 10/2013 | McColloch |
| 2014/0222177 | A1 | 8/2014 | Thurman et al. |
| 2014/0270375 | A1* | 9/2014 | Canavan ................ A61B 5/681 382/103 |
| 2014/0301598 | A1 | 10/2014 | Marty |
| 2015/0170530 | A1 | 6/2015 | Damman |
| 2015/0324751 | A1 | 11/2015 | Orenstein |
| 2015/0332450 | A1 | 11/2015 | Marty et al. |
| 2016/0027325 | A1 | 1/2016 | Malhotra |
| 2016/0096067 | A1 | 4/2016 | Ianni |
| 2016/0193518 | A1* | 7/2016 | Baxter ............... A63B 21/0442 473/483 |
| 2017/0095716 | A1* | 4/2017 | Lewis ................ A63B 24/0062 |
| 2018/0075392 | A1 | 3/2018 | Surane |
| 2019/0111317 | A1 | 4/2019 | Young et al. |
| 2020/0023262 | A1 | 1/2020 | Young et al. |
| 2024/0335725 | A1 | 10/2024 | Young et al. |

OTHER PUBLICATIONS

"Applying Deep Learning to Basketball Trajectories"—Shah et al, ARXIV, Aug. 16, 2016 https://ui.adsabs.harvard.edu/abs/2016arXiv160803793S/abstract (Year: 2016).*

International Search Report and Written Opinion in International Application No. PCT/US2018/055712 mailed Jan. 8, 2019, 11 pages.

U.S. Appl. No. 62/729,232: US Provisional Application filed Sep. 10, 2018, 68 pages, Doc 066.

U.S. Appl. No. 62/729,232: Filing Receipt dated Sep. 19, 2028, 3 pages, Doc 067.

U.S. Appl. No. 16/159,436: US Patent Application filed Oct. 12, 2018, 103 pages, Doc 001.

U.S. Appl. No. 16/159,436: Filing Receipt dated Nov. 2, 2018, 3 pages, Doc 002.

U.S. Appl. No. 16/159,436: Informational Notice dated Nov. 2, 2018, 1 page, Doc 003.

U.S. Appl. No. 16/159,436: Notice of Publication dated Apr. 18, 2019, 1 page, Doc 004.

U.S. Appl. No. 16/159,436: Non-final Office Action dated Dec. 11, 2019, 12 pages, Doc 005.

U.S. Appl. No. 16/159,436: Amendment filed Jun. 8, 2020, 12 pages, Doc 006.

U.S. Appl. No. 16/159,436: Final Office Action dated Jul. 17, 2020, 16 pages, Doc 007.

U.S. Appl. No. 16/159,436: Notice of Appeal filed Oct. 19, 2020, 2 pages, Doc 008.

U.S. Appl. No. 16/159,436: Appeal Brief filed Dec. 21, 2020, 28 pages, Doc 009.

U.S. Appl. No. 16/159,436: Examiner's Answer to Appeal Brief dated Feb. 25, 2001, 10 pages, Doc 010.

U.S. Appl. No. 16/159,436: Reply Brief filed Apr. 26, 2021, 30 pages, Doc 011.

U.S. Appl. No. 16/159,436: Patent Board Decision dated Jun. 15, 2022, 26 pages, Doc 012.

U.S. Appl. No. 16/159,436: RCE and Amendment filed Aug. 15, 2022, 13 pages Doc 013.

U.S. Appl. No. 16/159,436: Nonfinal Office Action dated Sep. 8, 2022, 11 pages, Doc 014.

U.S. Appl. No. 16/159,436: Notice of Appeal filed Feb. 8, 2023, 4 pages, Doc 015.

U.S. Appl. No. 16/159,436: Appeal Brief filed Mar. 7, 2023, 15 pages, Doc 016.

U.S. Appl. No. 16/159,436: Examiner's Answer to Appeal Brief dated Apr. 17, 2023, 8 pages, Doc 017.

U.S. Appl. No. 16/159,436: Patent Board Decision dated Oct. 2, 2024, 15 pages, Doc 018.

U.S. Appl. No. 16/159,436: RCE and Amendment filed Dec. 2, 2024, 15 pages, Doc 019.

PCT Application No. PCT/US2018/055712: PCT Application filed Oct. 12, 2018, pages, Doc 020.

PCT Application No. PCT/US2018/055712: International Preliminary Report of Patentability dated Jun. 7, 2019, 46 pages, Doc 022.

EP Application No. 18866764: Request for EP Entry filed May 7, 2020, 6 pages, Doc 023.

EP Application No. 18866764: Amendment filed Nov. 25, 2020, 12 pages, Doc 024.

EP Application No. 18866764: EP Search Report and Opinion dated Jun. 8, 2021, 10 pages, Doc 025.

EP Application No. 18866764: Rule 70 Communication dated Jun. 25, 2021, 1 page, Doc 026.

EP Application No. 18866764: Notice of Loss of Rights dated Jan. 25, 2022, 2 pages, Doc 027.

U.S. Appl. No. 16/588,158: Patent Application filed Sep. 30, 2019, 68 pages, Doc 041.

U.S. Appl. No. 16/588,158: Filing Receipt and Informational Notice dated Oct. 17, 2019, 5 pages, Doc 042.

U.S. Appl. No. 16/588,158: Notice of Publication dated Jan. 23, 2020, 1 page, Doc 043.

U.S. Appl. No. 16/588,158: Nonfinal Office Action dated May 27, 2020, 14 pages, Doc 044.

U.S. Appl. No. 16/588,158: Amendment filed Oct. 27, 2020, 15 pages, Doc 045.

U.S. Appl. No. 16/588,158: Final Office date Nov. 10, 2020, 17 pages, Doc 046.

U.S. Appl. No. 16/588,158: Notice of Appeal filed Apr. 12, 2021, 2 pages, Doc 047.

U.S. Appl. No. 16/588,158: Jun. 14, 2021, 19 pages, Doc 048.

U.S. Appl. No. 16/588,158: Nov. 12, 2021, 12 pages, Doc 049.

U.S. Appl. No. 16/588,158: Amendment filed May 12, 2022, 10 pages, Doc 050.

U.S. Appl. No. 16/588,158: Final Office Action dated Sep. 9, 2022, 13 pages, Doc 051.

U.S. Appl. No. 16/588,158: RCE and Amendment filed Mar. 7, 2023, 14 pages, Doc 052.

U.S. Appl. No. 16/588,158: Nonfinal Office Action dated Mar. 30, 2023, 14 pages, Doc 053.

U.S. Appl. No. 16/588,158: Amendment filed Aug. 30, 2023, 12 pages, Doc 054.

U.S. Appl. No. 16/588,158: Notice of Allowance date Oct. 2, 2023, 12 pages, Doc 055.

U.S. Appl. No. 16/588,158: Issue Fee Payment and 312 Amendment filed Oct. 27, 2023, 3 pages, Doc 056.

U.S. Appl. No. 16/588,158: Response to 312 Amendment dated Nov. 9, 2023, 2 pages, Doc 057.

U.S. Appl. No. 16/588,158: Issue Notification dated Nov. 22, 2023, 2 pages, Doc 058.

U.S. Appl. No. 18/500,299: Patent Application filed Nov. 2, 2023, 70 pages, Doc 059.

U.S. Appl. No. 18/500,299: Filing Receipt and notice to File Missing Parts dated Nov. 16, 2023, 6 pages, Doc 060.

U.S. Appl. No. 18/500,299: Response to Notice of Missing Parts filed Jun. 17, 2024, 7 pages, Doc 061.

U.S. Appl. No. 18/500,299: Preliminary Amendment filed Jun. 17, 2024, 12 pages, Doc 062.

U.S. Appl. No. 18/500,299: Updated Filing Receipt dated Jul. 1, 2024, 4 pages, Doc 063.

U.S. Appl. No. 18/500,299: Nonfinal Office Action dated Sep. 29, 2024, 14 pages, Doc 064.

U.S. Appl. No. 18/500,299: Notice of Publication dated Oct. 10, 2024, 1 page, Doc 065.

(56) References Cited

OTHER PUBLICATIONS

U.S. Appl. No. 62/571,724: US Provisional Application filed Oct. 12, 2017, 128 pages, Doc 068.
U.S. Appl. No. 62/571,724: Filing Receipt and Notice to File Missing Parts dated Oct. 24, 2017, 5 pages, Doc 069.
U.S. Appl. No. 62/571,724: Response to Notice of Missing Parts filed Dec. 21, 2017, 5 pages, Doc 070.
U.S. Appl. No. 62/571,724: Updated Filing Receipt dated Dec. 26, 2017, 3 pages, Doc 071.
U.S. Appl. No. 63/562,679: US Provisional Application filed Mar. 7, 2024, 658 pages, Doc 072.
U.S. Appl. No. 63/562,679: Filing Receipt dated Mar. 15, 2024, 3 pages, Doc 073.
U.S. Appl. No. 63/719,816: US Provisional Application filed Nov. 13, 2024, 351 pages, Doc 074.
U.S. Appl. No. 63/719,816: Filing Receipt dated Nov. 19, 2024, 3 pages, Doc 075.
U.S. Appl. No. 16/159,436: Nonfinal Office Action dated Feb. 7, 2025, 17 pages, Doc 076.
U.S. Appl. No. 16/159,436: Response to Nonfinal Office Action filed May 7, 2025, 15 pages, Doc 077.
U.S. Appl. No. 16/159,436: Final Office Action dated May 29, 2025, 13 pages, Doc 078.
U.S. Appl. No. 16/159,436: Response to Final Office Action filed Jul. 28, 2025, 18 pages, Doc 079.
U.S. Appl. No. 16/159,436: Advisory Action dated Aug. 1, 2025, 4 pages, Doc 080.
U.S. Appl. No. 18/500,299: Response to Nonfinal Office Action filed Jan. 29, 2025, 5 pages, Doc 081.
U.S. Appl. No. 18/500,299: eTerminal Disclaimer filed Mar. 14, 2025, 8 pages, Doc 082.
U.S. Appl. No. 18/500,299: Notice of Allowance/Allowability dated Mar. 28, 2025, 19 pages, Doc 083.
U.S. Appl. No. 18/500,299: Issue Fee and Comments on Reasons for Allowance filed Jun. 30, 2025, 6 pages, Doc 084.
U.S. Appl. No. 18/500,299: Issue Notification dated Jul. 16, 2025, 6 pages, Doc 085.
U.S. Appl. No. 19/251,580: Continuation Application filed Jun. 26, 2025, 71 pages, Doc 086.

\* cited by examiner

SYSTEM AND METHOD FOR SPORTS SOCIAL MEDIA APPLICATION

CROSS REFERENCE

The present application claims priority from and is a Continuation-in-Part of U.S. Non-Provisional patent application Ser. No. 16/159,436 entitled "SYSTEM AND METHOD OF BASKETBALL TESTING," filed Oct. 12, 2018, which claims priority from U.S. Provisional Patent Application No. 62/571,724 entitled "DISTRIBUTED NETWORKED COMPUTER PLATFORM FOR ATHLETICS," filed Oct. 12, 2017, and which claims priority from U.S. Provisional Patent Application No. 62/729,232 entitled "SYSTEM AND METHOD FOR SPORTS SOCIAL MEDIA APPLICATION," filed Sep. 10, 2018, the entire contents of each of which are incorporated herein by reference in their entirety.

FIELD OF THE DISCLOSURE

The present disclosure is generally related to a sports social media application.

BACKGROUND

Coaching and recruiting have been late to advance from paper to digital. Coaches often distribute hardcopies of drills and plays, take paper notes, score drills on paper sheets, etc. Coaches and recruiters often use multiple third party systems for compiling data, translating documents into digital form, contacting players, scoring players, predicting performance, etc. Often, these third party systems are not compatible with each other. As such, a disproportionate amount of time and effort involved in coaching and recruiting involves administrative tasks rather than substantive coaching and recruiting.

SUMMARY

In a particular implementation, a method includes selecting, by a computer using a sports social media application, a test. The method also includes selecting a user to send the test to. The method further includes sending, by the computer using the social media sports application, test data associated with the test to a device associated with the user.

In another particular implementation, a method includes searching, by a computer using a sports social media application, for a user, selecting the user, and selecting a test for the user. The method also includes initiating administration of the test and generating test performance data based on the test. The method further includes sending, by the computer using the sports social media application, the test performance data.

In yet another particular implementation, a method includes receiving, at a computer via a sports social media application, test data to be performed by a user associated with the computer. The method also includes initiating a test based on the test data and capturing video of the user performing the test. The method includes generating test performance data based on the video. The method further includes sending, by the computer, the test performance data via the sports social media application.

By use of a sports social media application, a coach and/or recruiter can stay in contact with players, create custom drills, send players drills, monitor player progress, and manage recruiting. Additionally, by aggregating user performance in the sports social media application, the sports social media application can enable a server or a client to predict future progress of a player.

DETAILED DESCRIPTION

The disclosed embodiments provide systems and methods for operating a sports social media application. The system includes a server and multiple client devices running the sports social media application. The sports social media application provides a centralized communication platform for players, parents and coaches. Coaches can share camp schedules team, schedules, leaderboards, photo and video highlights, and other relevant information directly with participants. Players and parents can also collaborate and engage with coaches and each other.

The sports social media application includes a built-in testing program which enables coaches to create and send tests, and enables players to measure and evaluate their athletic performance and to improve their skills at every level of the game. The sports social media application includes an analytics program to measure, track, evaluate, and predict the growth and progress of a player's development over time. Additionally, coaches and recruiters can measure, track, evaluate, and predict the growth and progress the player's development over time to make more informed coaching and recruiting decisions.

The sports social media application also provides a forum for individual players to connect, compete, network, and share with coaches, recruiters, schools and teammates, via a dedicated application, giving users increased visibility and access as compared to traditional recruiting process, which involves sending video files to coaches and recruiters.

Biometric hardware, RFID, and greatly enhanced video capability generate large amounts of performance data for elite athletes and the college and professional programs that depend on them. However, there is no industry standard or corresponding platform for professional and amateur organizations to monitor recruiting candidates or young athletes to effectively measure, track, and benchmark their growth and progress as they grow up and work hard to get better. The disclosed sports social media application enables the integration, use, and protection of the performance data. Additionally, amateur and young athletes can engage in a sports centric social network to share their skills, progress, and passion outside traditional social media and social network applications.

Figure 1:
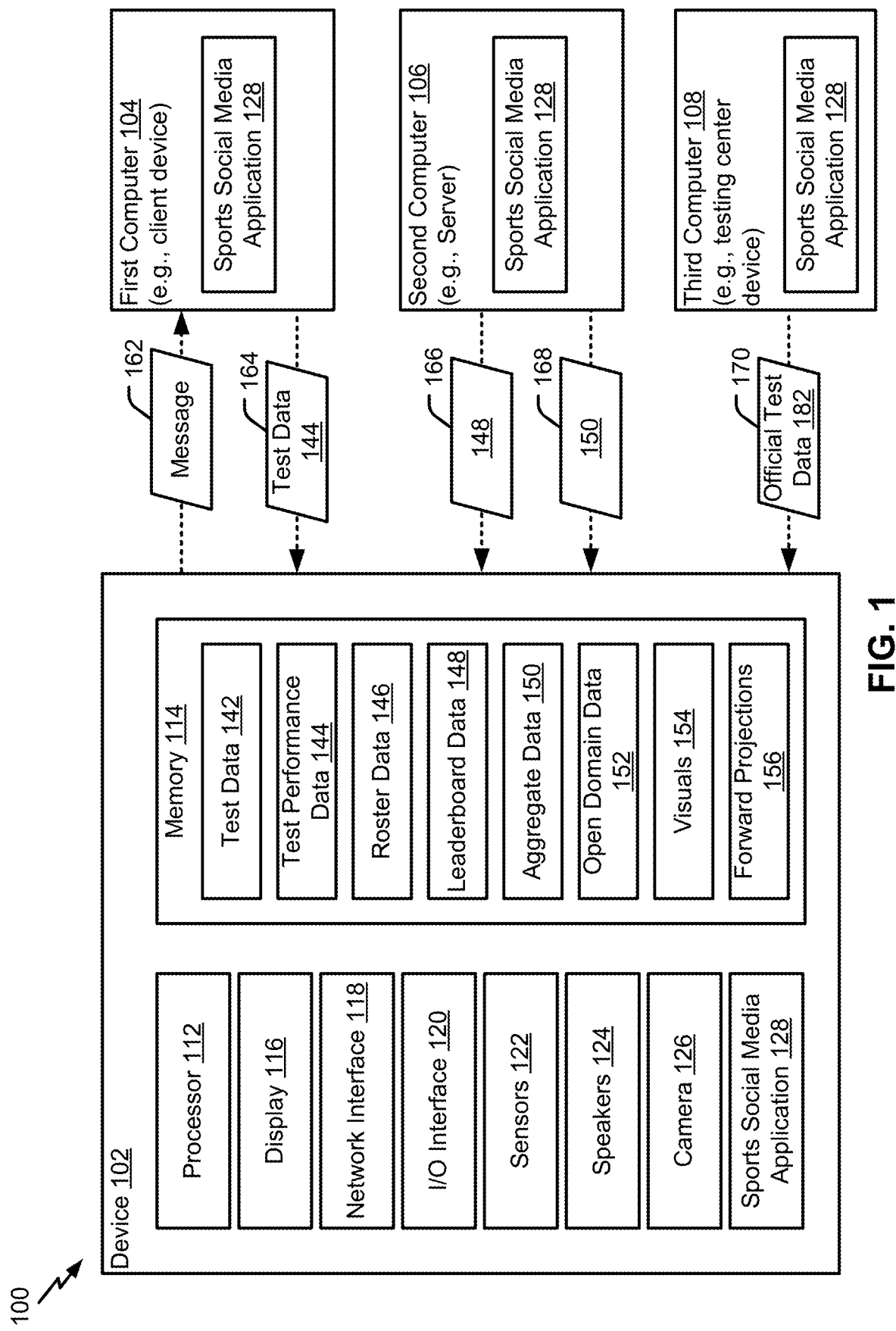
FIG. 1 is a block diagram that illustrates an example a system for a sports social media application.

FIG. 1 illustrates a block diagram of an example of a system 100 for a sports social media application 128. The system 100 includes a device 102, a first computer 104, a second computer 106, and a third computer 108. The device 102 may include or correspond to mobile device, a laptop computer, or a desktop computer. As illustrated in the example of FIG. 1, the device 102 corresponds to a client device (e.g., a smartphone) of the sports social media application 128 for a coach user.

The device 102 includes a processor 112, a memory 114, a display 116, a network interface 118, an input/output (I/O) interface 120, sensors 122, speakers 124, a camera 126, and the sports social media application 128. The processor 112 is coupled to the memory 114 and is configured to execute instructions stored in the memory 114. In a particular aspect, the sports social media application 128 is stored in the memory 114 and is executable by the processor 112.

The display 116 is configured to output a graphical user interface (GUI) responsive to signals generated by the processor 112 and/or a graphics processing unit (GPU) thereof (not shown). In some implementations, such as when the device 102 is a smartphone, the display 116 includes a touchscreen display. The network interface 118 includes or corresponds to a wired networking interface, a wireless networking interface, or a combination thereof, and is configured to communicate with other devices, such as the first computer 104, the second computer 106, the third computer 108, or a combination thereof, via a network.

The sensors 122 are configured to generate sensor data, which is used by the device 102 and the sports social media application 128 to generate and update the GUI. The sensors 122 include one or more of an inertial measurement unit (IMU), a microphone, or a combination thereof. The IMU includes one or more gyroscopes, accelerometers, magnetometers, or a combination thereof, and is configured to generate sensor data that indicates user movement, such as speed, acceleration, force, etc.

The microphone is configured to receive user audio inputs (e.g., voice commands) and is configured to generate sensor data indicative of the audio inputs. The microphone sensor data can enable the device 102 and the sports social media application 128 to generate and update the GUI responsive to user voice commands. In some implementations, the microphone corresponds to a microphone array.

The speakers 124 are configured to output audio indications (e.g., instructions or notifications) and content to the user. Accordingly, the user can hear instructions and notifications while focusing on taking a test.

The camera 126 is configured to capture video and generate video data. In some implementations, the video data can enable the sports social media application 128 to process the video data to determine test results (e.g., test performance data), certify test results, or both. For example, the sports social media application 128 uses machine vision to determine if a player makes a basket, hits a pitch, throws a strike, etc.

The sports social media application 128 is configured to generate and update a GUI displayed by the display 116. Additionally, the sports social media application 128 is configured to generate messages, create tests, send tests, monitor tests, track performance, and predict performance, as further described herein.

The first computer 104, the second computer 106, and the third computer 108 each include the sports social media application 128 or modules thereof. Additionally, each of the first computer 104, the second computer 106, and the third computer 108 may include one or more of the components of the device 102.

As illustrated in the example of FIG. 1, the first computer 104 corresponds to a client device of the sports social media application 128. For example, the first computer 104 can be a smartphone, laptop, or desktop computer associated with a player user.

The first computer 104 is configured to receive messages via the sport social media application 128, such as a message 162 from the device 102. The messages include practice updates, playbook updates, sports highlights, sports news, or a combination thereof. Additionally, the messages can include test data 142 and can be configured to assign tests to one or more player users. To illustrate, the test data 142 can be assigned to multiple player users of a particular roster indicated by roster data 146. The roster data 146 enables coaches to create and edit team rosters, camp rosters, recruiting rosters, or a combination thereof, to manage multiple players, camps, and/or teams.

As illustrated in the example of FIG. 1, the second computer 106 corresponds to a server of the sports social media application 128. For example, the second computer 106 can be central server that facilitates communications (e.g., messages) of the sports social media application 128, provides data (e.g., leaderboard data 148, aggregate data 150, open domain data 152, etc.) to client devices, or a combination thereof Although a server is described, it is to be understood that in some implementations server-side operations may be performed by cloud computer(s), virtual machine(s), etc.

The second computer 106 is configured to route communications of the sports social media application 128 for client devices. For example, the second computer 106 may receive a particular message from the device 102 and forward the particular message to the first computer 104. The second computer 106 is further configured to receive test performance data 144 from the client devices. The second computer 106 generates leaderboard data 148 and aggregate data 150 based on test performance data 144 corresponding to multiple player users. The second computer 106 is configured to send the leaderboard data 148 and the aggregate data 150 to the client devices. In some implementations, the second computer 106 sends a portion of the aggregate data 150 (e.g., aggregate data 150 corresponding to public test results, such as test performance data 144 flagged as public). This enables client devices to generate more accurate forward projections 156, as further described herein, while ensuring privacy and that proprietary data (e.g., private test performance data 144) is not publicly shared.

Figure 2:
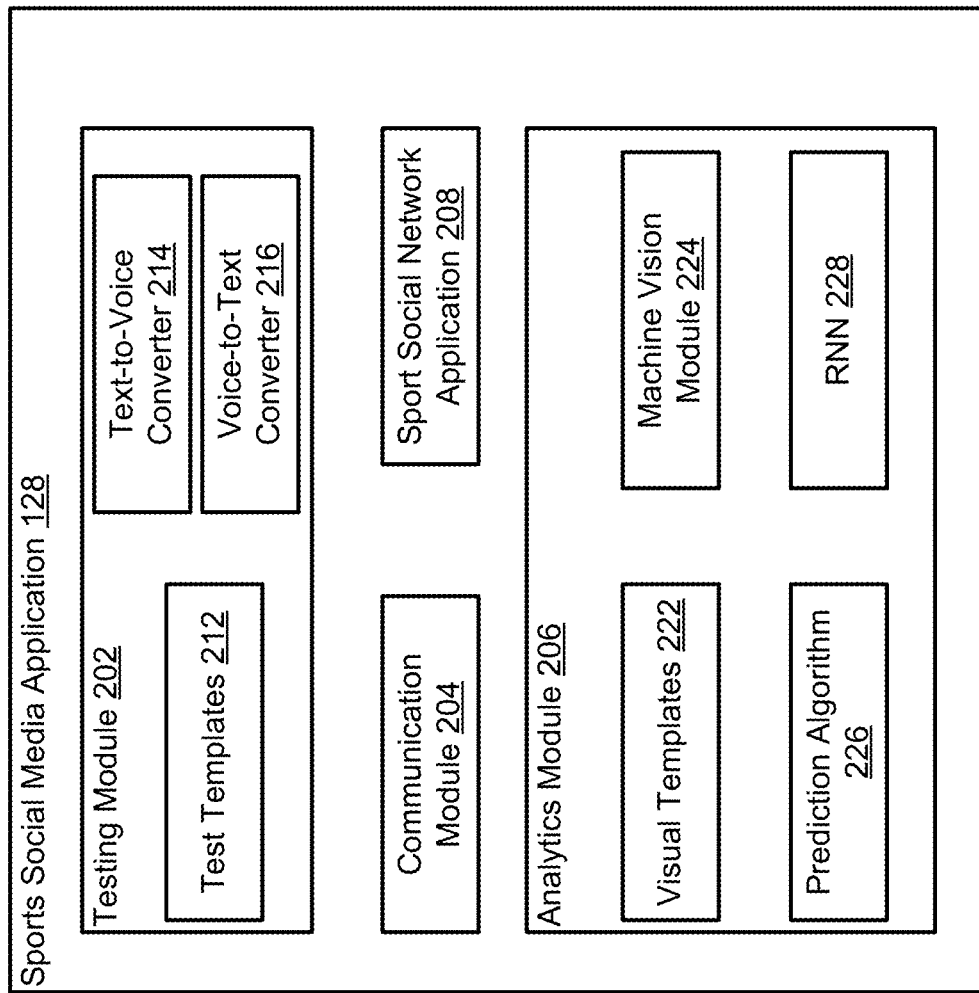
FIG. 2 is a block diagram that illustrates an example of a sports social media application.
Figure 2:

In some implementations, the second computer 106 generates visuals 154 and forward projections 156 based on the aggregate data 150 or based on the aggregate data 150 and open domain data 152, as described further with reference to FIG. 2. The visuals 154 include or correspond to graphical representations of the test performance data 144, the forward projections 156, or both. As illustrative, non-limiting examples, the visuals 154 include a histogram, a scatter plot, a pie chart, or a bar graph. The forward projections 156 include or correspond to estimates of future test results (future or predicted test performance data 144) for a player user, estimates of future statistics and results for a team (e.g., team forward projections), or both. For example, the forward projections 156 include expected results. As illustrative, non-limiting examples, the forward projections 156 include estimated points, assists, goals, wins, losses, etc. The open domain data 152 corresponds to data that is outside of the sports social media application 128 and is available to the public. As illustrative, non-limiting examples, the open domain data 152 includes weather data, player statistics from outside sources, contract data, betting odds data, etc.

As illustrated in the example of FIG. 1, the third computer 108 corresponds to a client device of a testing center associated with the sports social media application 128. For example, the third computer 108 is a computer of an authorized or certified facility to administer tests identified by test data 142 and to generate official test performance data 182. The third computer 108 may receive the test data 142 directly from the device 102 or may indirectly receive the test data 142 from the device 102 via the first computer 104, the second computer 106, or both. For example, the device 102 may send the test data 142 to the first computer 104 directly or via the second computer 106, and the first computer 104 may send or upload the test data 142 to the third computer 108.

The third computer 108 is configured to send the official test performance data 182 to one or more devices or computers. For example, if the test data 142 indicates a public test, the official test performance data 182 is sent to the second computer 106. Alternatively, if the test data 142 indicates a private test, the official test performance data 182 is sent to the device 102 (assigning user), the first computer 104 (player user), or both.

During operation, the device 102 sends a message 162 to the first computer 104 using the sports social media application 128 responsive to user (e.g., coach user) input. For example, the network interface 118 sends the message 162, which includes test data 142 indicating a particular test for a player user associated with the first computer 104. The message 162 can be sent directly to the first computer 104, as illustrated in FIG. 1, or can be sent via the second computer 106. Operation of the sports social media application 128 and GUIs thereof to select a user and a test are described with reference to FIGS. 3-10.

Responsive to the first computer 104 receiving the message 162, the first computer 104 generates a notification indicating that a test corresponding to the test data 142 has been assigned to the player user associated with the first computer. The player user can use the sports social media application 128 to initiate and administer the test. For example, the sports social media application 128 of the first computer 104 generates GUIs, voice instructions, audio notifications, or a combination thereof, to administer the test. The sports social media application 128 of the first computer 104 receives user inputs indicating test results and generates test performance data 144 based on the user inputs. Additionally or alternatively, the sports social media application 128 of the first computer 104 captures video, sensor data, or both, and generates the test performance data 144 based on one or more of the user inputs, the video, or the sensor data. The first computer 104 sends the test performance data 144 to the device 102, the second computer 106, or both. The test performance data 144 may be validated (e.g., certified) by including the video in the test performance data 144 for verification of the test result indicated by the test performance data 144 or by including the video in a second message 164 to the device 102, the second computer 106, or both. The device 102, the second computer 106, or both, can validate the test performance data 144 based on the video. For example, a user associated with the device 102 may manually review the video and confirm the test results or a machine vision module can automatically review the video and confirm the test results.

In other implementations, the player user associated with the first computer 104 travels to a location of the third computer 108 to take an official test or to generate official test results (i.e., official test performance data 182). One or more users (e.g., testing officials) associated with the third computer 108 administer the test using the sports social media application 128 and one or more cameras thereof. The official test performance data 182 generated by the third computer 108 is sent to the device 102, the first computer 104, the second computer 106, or a combination thereof, using the sports social media application 128. As illustrated in the example of FIG. 1, the third computer 108 sends a third message 166, including the official test performance data 182, to the device 102. Similarly, in other implementations, the player user associated with the first computer 104 is near or travels to a location of the device 102, and the coach user associated with the device 102 administers the test using the device 102.

After receiving the test performance data 144 corresponding to the test data 142, the device 102 generates one or more visuals 154, one or more forward projections 156, or a combination thereof, based on the test performance data 144 (or the official test performance data 182). Additionally, the device 102 can request leaderboard data 148 from the second computer 106 to evaluate how the player user associated with the first computer 104 ranks compared to other users of the sports social media application 128. As illustrated in the example of FIG. 1, the second computer 106 sends a fourth message 168, including the leaderboard data 148, to the device 102. Further, the device 102 can request the aggregate data 150 from the second computer 106. As illustrated in the example of FIG. 1, the second computer 106 sends a fifth message 170, including the aggregate data 150, to the device 102. The aggregate data 150 enables the device 102 to generate more accurate forward projections 156. To illustrate, the aggregate data 150 from the second computer 106 has a larger sample size than the aggregate data 150 that is locally stored on the device 102.

FIG. 2 is a block diagram 200 of an example of the sports social media application 128 of FIG. 1. The sports social media application 128 includes a testing module 202, a communication module 204, an analytics module 206, and a sports social networking application 208.

The testing module 202 includes test templates 212, a text-to-voice converter 214, and a voice-to-text converter 216. The testing module 202 (e.g., a custom test builder module) is configured to administer tests, configure or customize tests, generate new tests, generate and manage a playbook, and generate test sets. For example, the testing module 202 generates the test data 142 of FIG. 1 based on test templates 212. The testing module 202 administers the test based on the test data 142. To illustrate, the text-to-voice converter 214 converts text of a test data 142 into audio commands to instruct a player user during the test. The testing module 202 generates test performance data 144 based on sensor data from the sensors 122 of FIG. 1, user inputs, video from the camera 126 of FIG. 1, or a combination thereof.

The testing module 202 has test builder and customization features that enable the testing module 202 to be applicable to a variety of different sports. For example, when employed in the field of basketball the sports social media application 128 outputs a graphical representation of a basketball court or portion thereof. A user can place markers and other graphical indicators along with annotations and/or audio instructions to create a custom test and enable a player user to carry out the test.

In some implementations, the testing module 202 can include one or more questions in the test data 142. For example, in the case of a Basketball shot test, did the player being tested make the shot or not? The testing module 202 generates buttons corresponding to answers or responses to the question, such as a make button and a miss button. In other implementations, the test data 142 may include non-binary questions that include free form or variable value answers. For example, in the domain of athletics, a user enters the time spent completing a specific course or distance.

The testing module 202 is further configured to generate a playbook or a test set. Further, the playbook or test set may be flagged as private or public. Thus, a coach user can keep such data private and only accessible to certain rosters, types or classes of players, or players that meet certain specific requirements.

The communication module 204 is configured to send and receive messages via the sports social media application 128 of FIG. 1, such as the sports social network application 208 thereof. For example, the communication module 204 is configured to access and initiate transmission of messages via the network interface 118 of the device 102. The messages includes chat messages (e.g., text messages) media messages (e.g., photo and/or video messages), and test assignment messages. As illustrative, non-limiting examples, the communication module 204 sends highlight video, instructional videos, sports news, etc., to devices associated with one or more users. The communication module 204 can send messages directly to other users (e.g., clients of the sports social networking application 208) or can send messages to other users via a central server, such as the second computer 106 of FIG. 1.

In a particular implementation, the communication module 204 receives or retrieves a test for a user when publication criteria of a particular test specified by another user (e.g., a coach who created the test) match the user. To illustrate, when the player user has met a certain performance criteria, is in the coaches' targeted groups, etc., the test data 142 corresponding to the particular test is received or retrieved by the communication module 204 and a notification or a feed entry is generated in the GUI.

The analytics module 206 includes visual templates 222, a machine vision module 224, a prediction algorithm 226, and one or more machine learning and/or artificial intelligence components. Examples of such component include, but are not limited to, Recurrent Neural Networks, such as an illustrative RNN 228. The visual templates 222 include data for creating the visuals 154 of FIG. 1. The machine vision module 224 is configured to generate validated or certified test performance data 144 based on video data corresponding to video captured by the camera 126 during the test. The prediction algorithm 226 is configured to generate the forward projections 156 of FIG. 1 based on the test performance data 144 and the aggregate data 150, such as by using the RNN 228. In some implementations, the RNN 228 is a RNN for continuous value prediction.

The analytics module 206 is configured to analyze test results (e.g., test performance data 144 or the official test performance data 182 of FIG. 1) and to represent the test results in graphical formats, such as by generating the visual 154 of FIG. 1. Additionally, the analytics module 206 is configured to employ statistical and machine learning techniques (for example, Holt Winters, ARMA/ARIMA, the RNN 228, etc.) to predict future test results for future tests based on the test results (test performance data 144) and the aggregate data 150 of FIG. 1. Such future test results can provide coaches with information and/or a graphical output that includes performance/test result curves abstracted from individual data.

Further, the analytics module 206 is configured to compare the test results of various users who have taken the same tests. For example, the analytics module 206 generates a histogram, a scatter plot, a pie chart, or another visualization that depicts test results from two or more users. As an illustrative, non-limiting example, a comparison of five players that have scored a certain number of points on a particular test can be contrasted on a pie chart indicating test results with respect to another test.

The analytics module 206 enables coaches to project likely performance of a user using predictive techniques (e.g., the predictive algorithm 226 and the RNN 228). The coach can use the estimated future performance to see the estimated progress and gauge or extrapolate where a certain player will be at some time in the future, such as by the end of a performance testing period, start of the season, playoffs, etc.

The sports social networking application 208 is configured to generate and update a GUI and to facilitate sending messages between users of the sports social networking application 208.

During operation, the testing module 202 generates a custom test responsive to user inputs. For example, a user selects a particular test template 212 of the testing module 202 and inputs audio data indicating test instruction to the sensors 122 of the device 102. Additionally or alternatively, the user may physical perform a portion of the test while holding or carrying the device 102, and the sensors 122 capture the user's movement and generate sensor data indicative of the user's movement (e.g., location, speed, timing, etc.). The testing module 202 generates test data 142 based on the sensor data, such as shot location information, passing route instruction information, etc.

The communication module 204 sends the test data 142 to a player user via the sports social network application 208, and the player user can take the test indicated by the test data 142. During administration of the test, the testing module 202 uses the text-to-voice converter 214 to generate audio commands to instruct the user and generates a GUI based on the test data 142. The testing module 202 generates the test performance data 144 based on user inputs and sensor data.

In some implementations, the machine vision module 224 processes video captured during the test to validate the test performance data 144. The analytics module 206 can modify the test performance data 144 to correct the test result indicated by the data or to certify or validate the test performance data 144.

The prediction algorithm 226 generates a forward projection 156 for the player user based on the test performance data 144 and the aggregate data 150, locally stored or received from the second computer 106 of FIG. 1. For example, the prediction algorithm 226 uses the RNN 228 to generate a forward projection 156 indicating an estimated future test result of the test taken, such as 40 yard dash time in four years. Additionally, the prediction algorithm 226 uses the RNN 228 to generate a second forward projection 156 indicating an estimated future test result of a different test, such as an three-point shooting drill score now and in two years. The analytics module 206 can further generate one or more visuals 154 illustrating the test performance data 144, a portion of the aggregate data 150, the forward projections 156, or a combination thereof, using the visual templates 222.

FIGS. 3-18 illustrate example GUIs output by the device 102 of FIG. 1. Operation of selecting and sending a test to a user is explained with reference to FIGS. 3-6. Additionally, operation of a roster evaluation is explained with reference to FIGS. 7 and 8. Another operation of a roster evaluation is explained with reference to FIGS. 9 and 10. Furthermore, operation of a leaderboard is explained with reference to FIG. 11.

Figure 3:
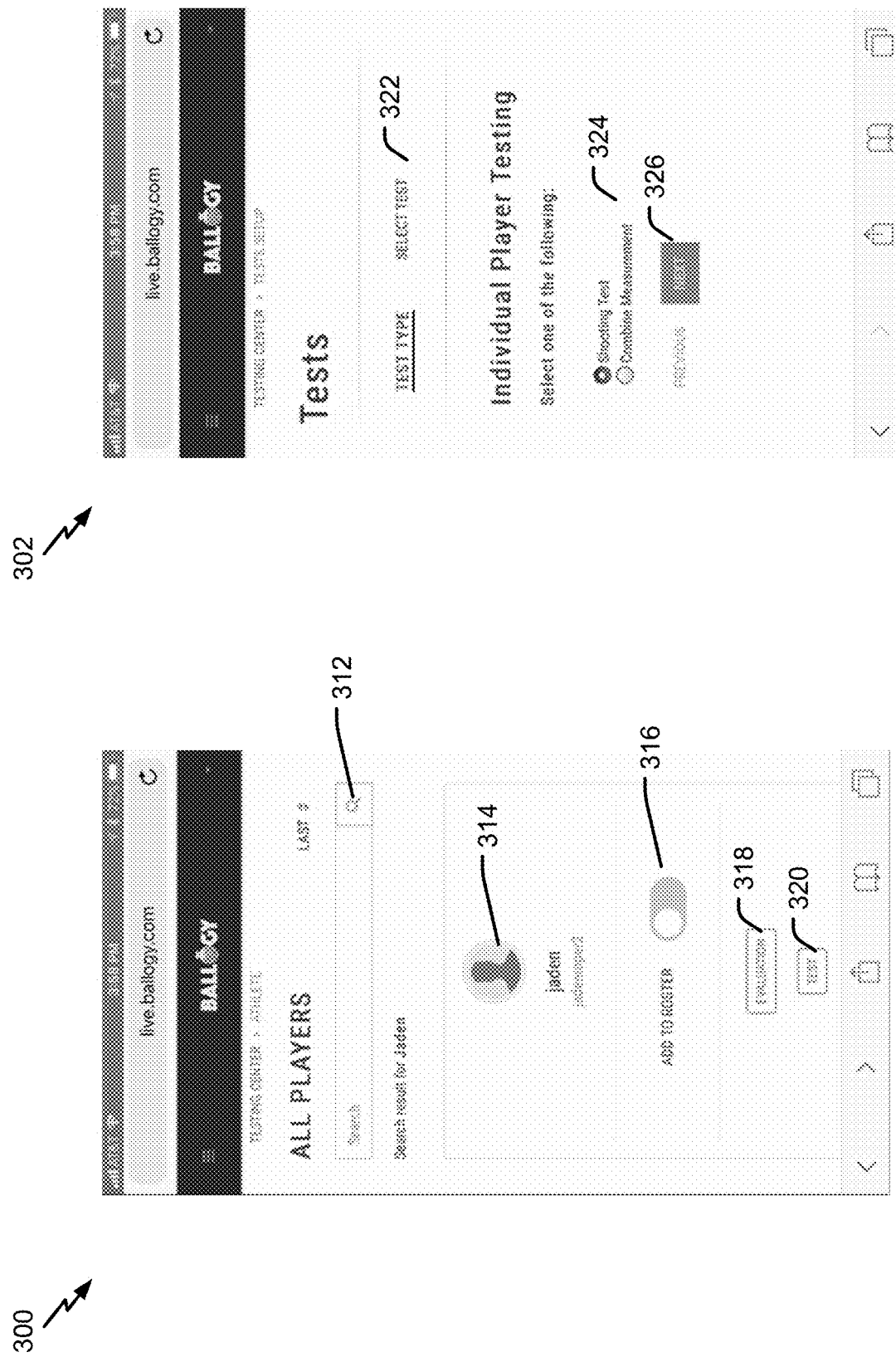
FIG. 3 is a diagram that illustrates examples of GUIs of a sports social media application.

FIG. 3 illustrates examples of testing center GUIs of the sports social media application 128. As illustrated in the example of FIG. 3, a first testing center GUI 300 includes a search bar 312, user identification information 314, an add-to-roster button 316, an evaluation button 318, and a test button 320. The search bar 312, when accessed may display a keyboard, a set of filters, list of players to search, or a combination thereof to facilitate user searching and selection. As illustrated in the example of FIG. 3, the user identification information 314 includes a user photo or identification photo, a name, and a username. The add-to-roster button 316 adds the current or selected user (Jaden) to one or more rosters. When accessed, the add-to-roster button 316 may display a keyboard, a set of filters, list of rosters to search, or a combination thereof to facility roster searching and selection. The test and evaluation buttons 318 and 320, when accessed, may display GUIs to enable evaluating the current or selected user (Jaden) and sending a test to the current or selected user (Jaden), as described with reference to FIG. 4-6.

As illustrated in the example of FIG. 3, a second testing center GUI 302 includes a test bar 322, test selection buttons 324, and a next button 326. The test bar 322, when accessed may display a keyboard, a set of filters, list of players to search, or a combination thereof, to facilitate user searching and selection.

Figure 4:
FIG. 4 is a diagram that illustrates examples of GUIs of a sports social media application.

FIG. 4 illustrates examples of testing center GUIs of the sports social media application 128. Responsive to a user selecting one of the test selection buttons 324 and activating the next button 326, the device 102 outputs a third testing center GUI 400. As illustrated in the example of FIG. 4, the third testing center GUI 400 corresponds to a combine shooting (100) test and includes information about the combine shooting (100) test. In other implementations, the third testing center GUI 400 includes more than one test. As illustrated in the example of FIG. 4, the third testing center GUI 400 includes test name 412, test description 414, and test instructions 416.

A fourth testing center GUI 402 includes detailed information for the selected combine shooting (100) test. As illustrated in the example of FIG. 4, the fourth testing center GUI 402 includes test participants 422, test instructions 416 (e.g., test quantity and test duration), test level 424 (e.g., shooting distance), a select button 426, test action type 428, test action instructions 430. FIG. 4 further depicts a test level pop-up window 432 for selecting the test level 424. In other implementations, the fourth testing center GUI 402 includes more or less information than illustrated in FIG. 4.

Figure 5:
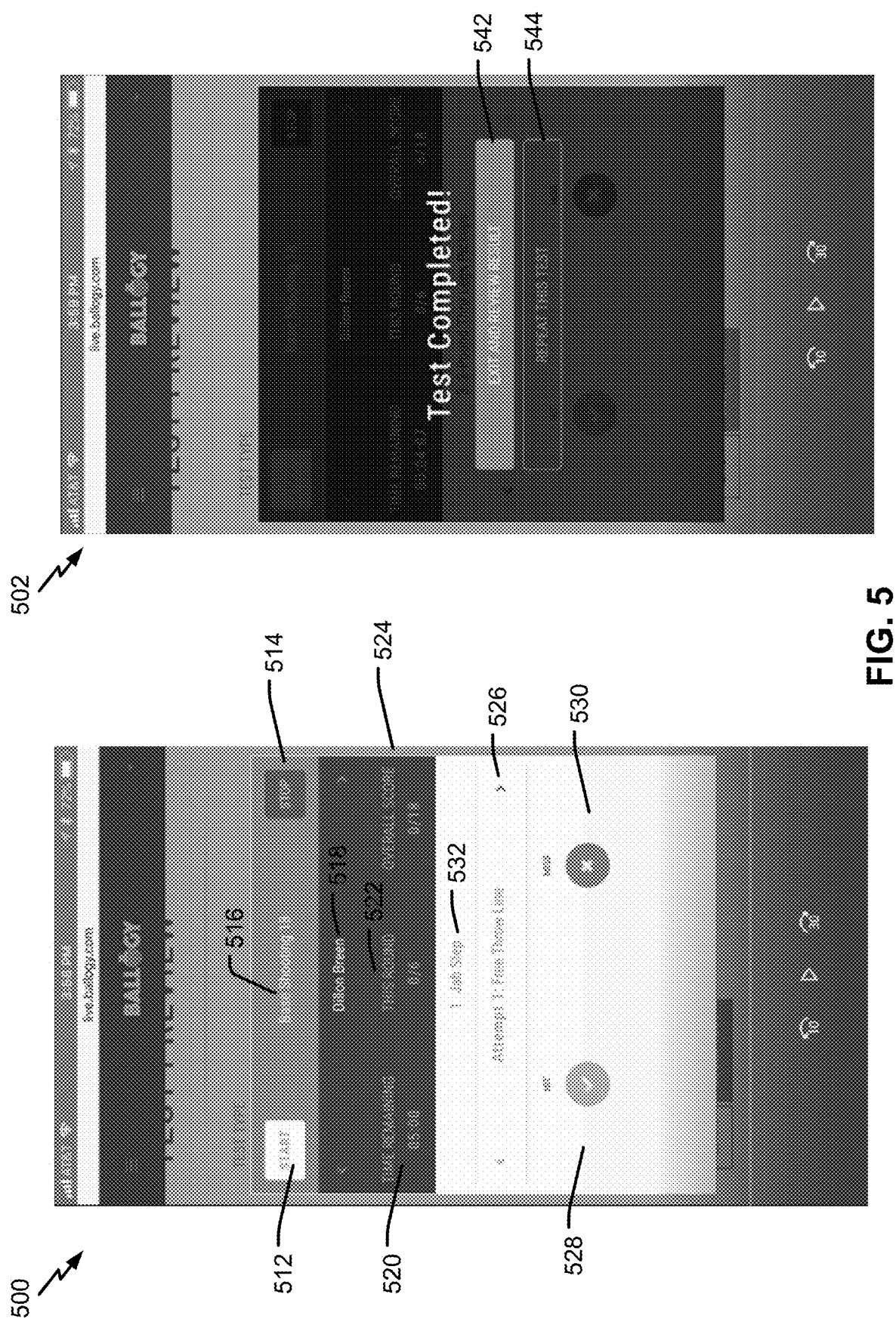
FIG. 5 is a diagram that illustrates examples of GUIs of a sports social media application.

FIG. 5 illustrates examples of testing center GUIs of the sports social media application 128. A fifth testing center GUI 500 includes information and buttons to administer the selected test. As illustrated in the example of FIG. 5, the fifth testing center GUI 500 includes a start button 512, a stop button 514, test title 516, player name 518, time remaining information 520, round score information 522, overall score information 524, attempt information 526, a make button 528, and a miss button 530. In some implementations, the fifth testing center GUI 500 includes instruction or type information 532. Responsive to a user selecting the start button 512, the device 102 updates the sixth testing center GUI 502 to begin the test. Additionally, the device 102 updated the sixth testing center GUI 502 responsive to user inputs via the make button 528 and the miss button 530, sensor data, video data, or a combination thereof. In other implementations, the fifth testing center GUI 500 includes more or less information than illustrated in FIG. 5, more or less buttons than illustrated in FIG. 5, other information or buttons than illustrated in FIG. 5, or a combination thereof.

Responsive to a user selecting the stop button 514, the device 102 outputs a sixth testing center GUI 502. The sixth testing center GUI 502 corresponds to a test completion GUI. As illustrated in the example of FIG. 5, the sixth testing center GUI 502 includes an exit and review button 542 and a repeat test button 544. In other implementations, the sixth testing center GUI 502 includes more or less information than illustrated in FIG. 5.

Figure 6:
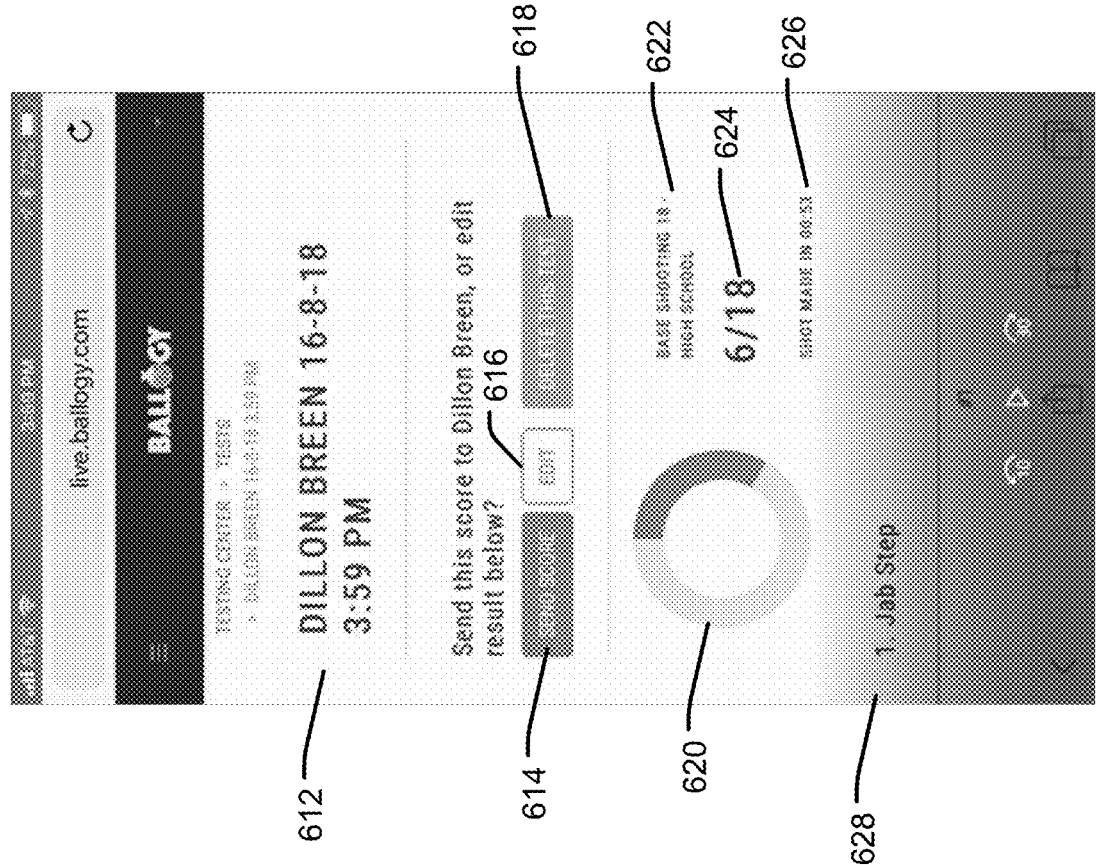
FIG. 6 is a diagram that illustrates another example of a testing center GUI of a sports social media application.

FIG. 6 illustrates an example of a seventh testing center GUI 600 of the sports social media application 128. Responsive to a user selecting the exit and review button 542 of FIG. 5, the device 102 outputs the seventh testing center GUI 600. The seventh testing center GUI 600 depicts test result information. As illustrated in the example of FIG. 6, the seventh testing center GUI 600 includes test identification information 612, a send score button 614, an edit test button 616, a delete test button 618, a test results graph 620, test information 622 (e.g., name and level), test result information 624, duration information 626, and test description information 628. In other implementations, the seventh testing center GUI 600 includes more or less information than illustrated in FIG. 6, more or fewer buttons than illustrated in FIG. 6, or a combination thereof.

Figure 7:
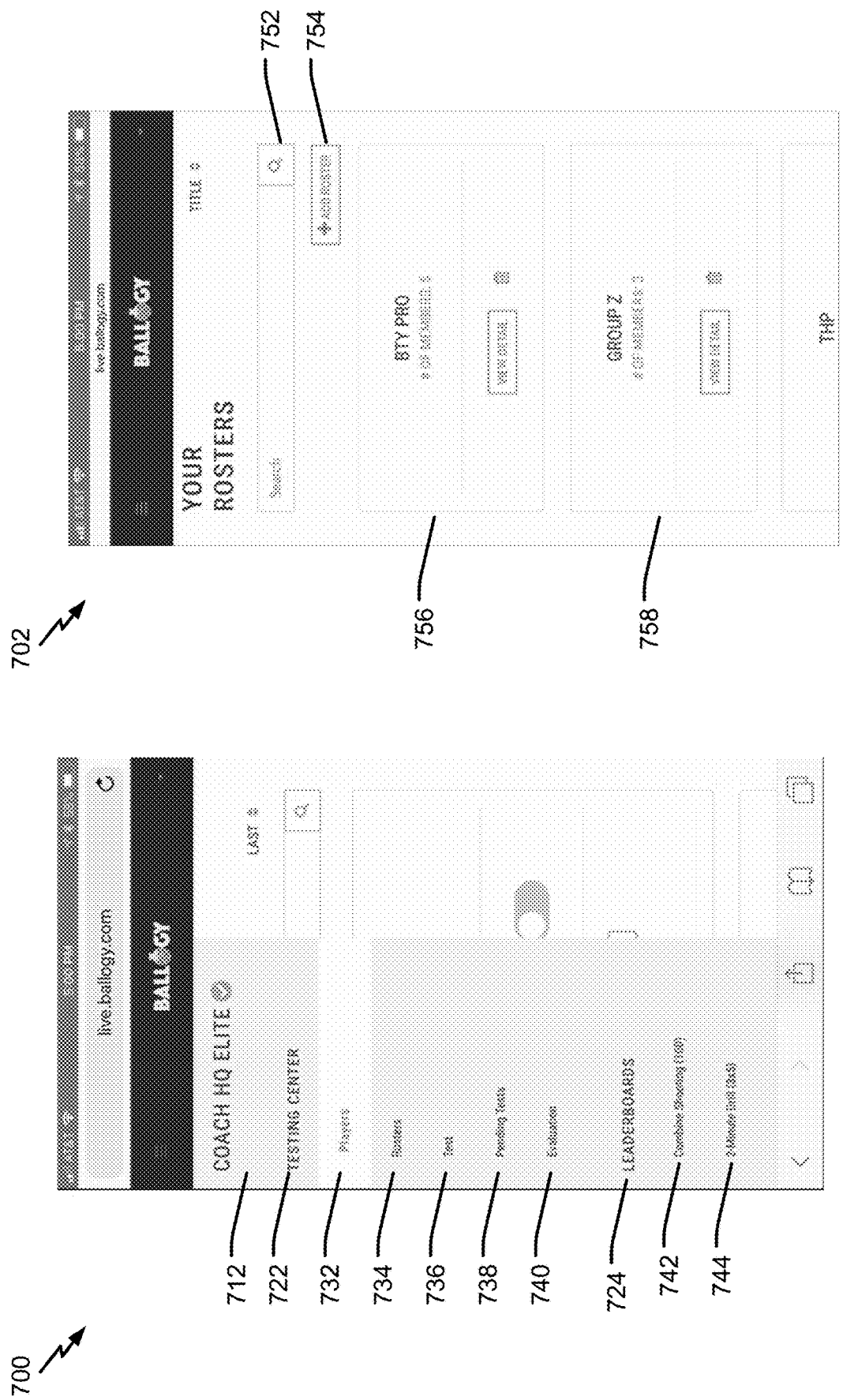
FIG. 7 is a diagram that illustrates examples of GUIs of a sports social media application.

FIG. 7 illustrates examples of testing center GUIs of the sports social media application 128. A first testing center GUI 700 depicts a navigation sidebar 712. As illustrated in the example of FIG. 7, the navigation sidebar 712 includes a link 722 to a testing center home and a link 724 to a leaderboards home. The navigation sidebar 712 may further include testing center and/or leaderboard subpage links. As illustrated in the example of FIG. 7, the navigation sidebar 712 includes testing center subpage links of a players link 732, a rosters link 734, a test link 736, a pending tests link 738, an evaluation link 740, and includes leaderboard subpage links of a combine shooting (100) leaderboard link 742 and a 2-minute drill (3×5) leaderboard link 744.

Responsive to a user activating the rosters link 734, the device 102 outputs a second testing center GUI 702. The second testing center GUI 702 depicts rosters of the user. As illustrated in the example of FIG. 7, the second testing center GUI 702 includes a roster search bar 752, an add roster button 754, a first roster 756, and a second roster 758. As illustrated in the example of FIG. 7, each roster 756, 758 includes name information, number of users or members, a view detail button, and remove roster button. Additionally, each roster may include additional information and buttons or fewer information and buttons than as illustrated in the example of FIG. 7.

Figure 8:
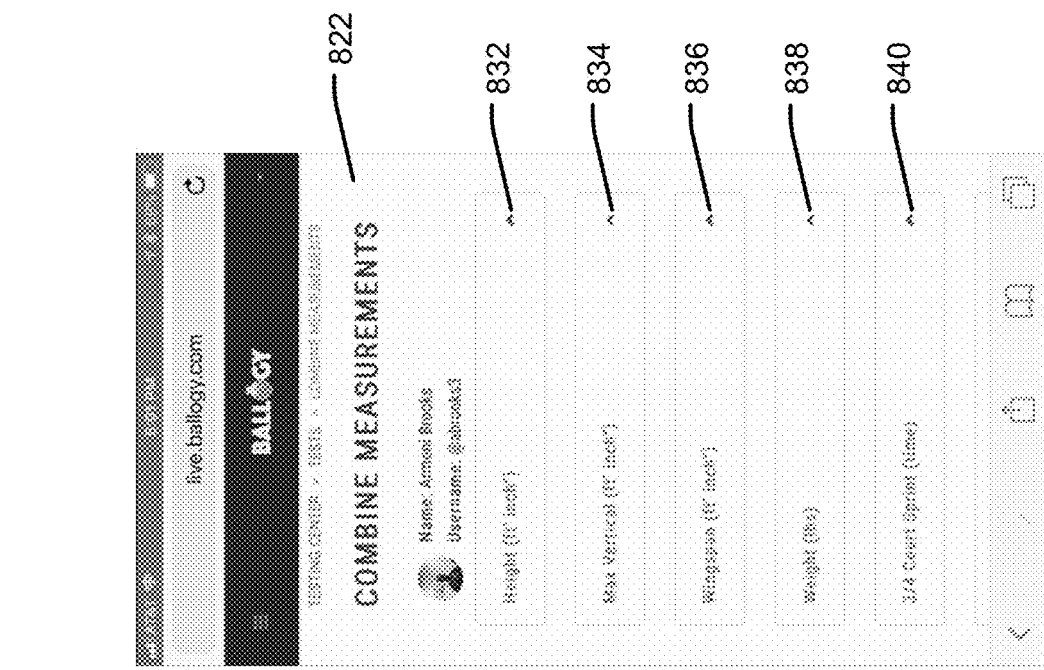
FIG. 8 is a diagram that illustrates examples of GUIs of a sports social media application.
Figure 8:
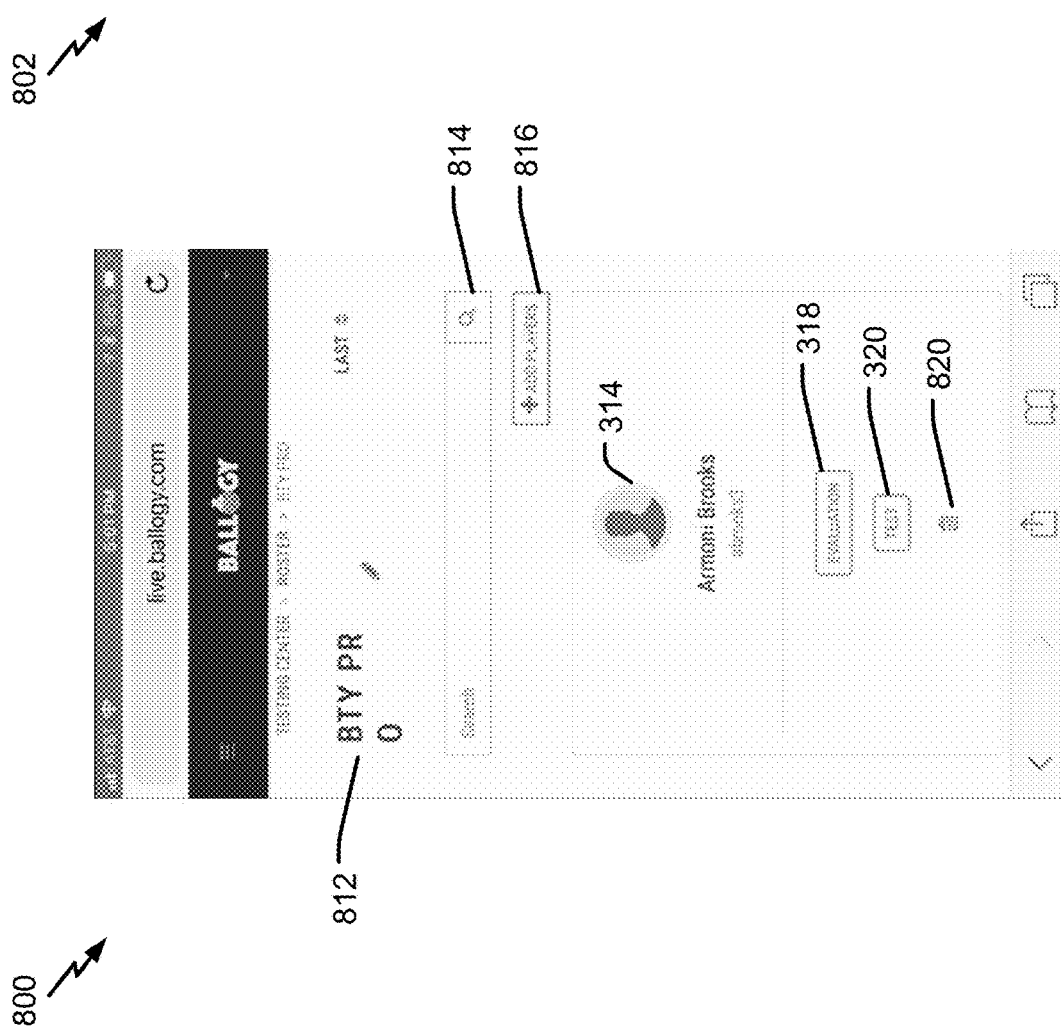

FIG. 8 illustrates examples of testing center GUIs of the sports social media application 128. A third testing center GUI 800 includes information about a selected roster. Responsive to a user activating the view detail button of the first roster 756 (BTY PRO) of the second testing center GUI 702 of FIG. 7, the device 102 outputs the third testing center GUI 800.

As illustrated in the example of FIG. 8, the third testing center GUI 800 includes roster name information 812, a player search bar 814, an add player button 816, and user identification information 314. Although the third testing center GUI 800 depicts only one player user in FIG. 8, in other implementations, the third testing center GUI 800 depicts multiple player users of the selected roster.

The third testing center GUI 800 also includes an evaluation button 318 and a test button, as described with reference to FIG. 3. The third testing center GUI 800 further includes a remove button 820. Selection of the remove button 820 removes the player from the selected roster.

Responsive to a user activating the evaluation button 318, activating the test button 320, or a combination thereof, of the third testing center GUI 800, the device 102 outputs a fourth testing center GUI 802. The fourth testing center GUI 802 corresponds to a combine measurement evaluation GUI and includes information about combine measurements. As illustrated in the example of FIG. 8, the fourth testing center GUI 802 includes a height field 832, a max vertical field 834, a wingspan field 836, a weight field 838, a 3/4 court sprint time field 840. In other implementations, the fourth testing center GUI 802 includes other information fields, more information fields, fewer information fields, or a combination thereof.

In some implementations, responsive to a user entering information for all of the fields 832-840 of the fourth testing center GUI 802 or selecting a next or complete button of the fourth testing center GUI 802, the device 102 outputs the third testing center GUI 800. For example, the user may finish evaluating a first user of the selected roster and the user returns to the roster page to select another user to evaluate.

Figure 9:
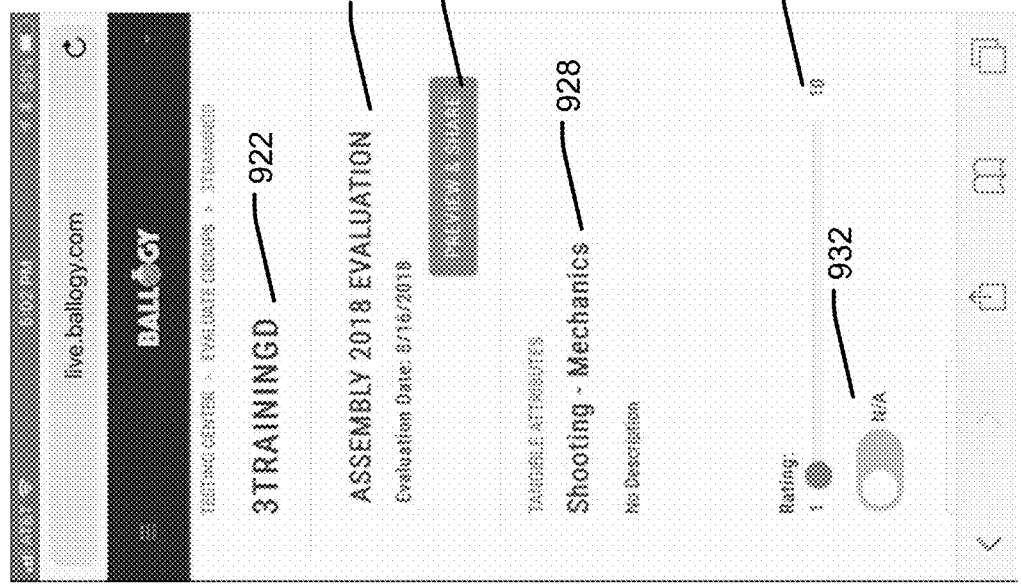
FIG. 9 is a diagram that illustrates examples of GUIs of a sports social media application.
Figure 9:
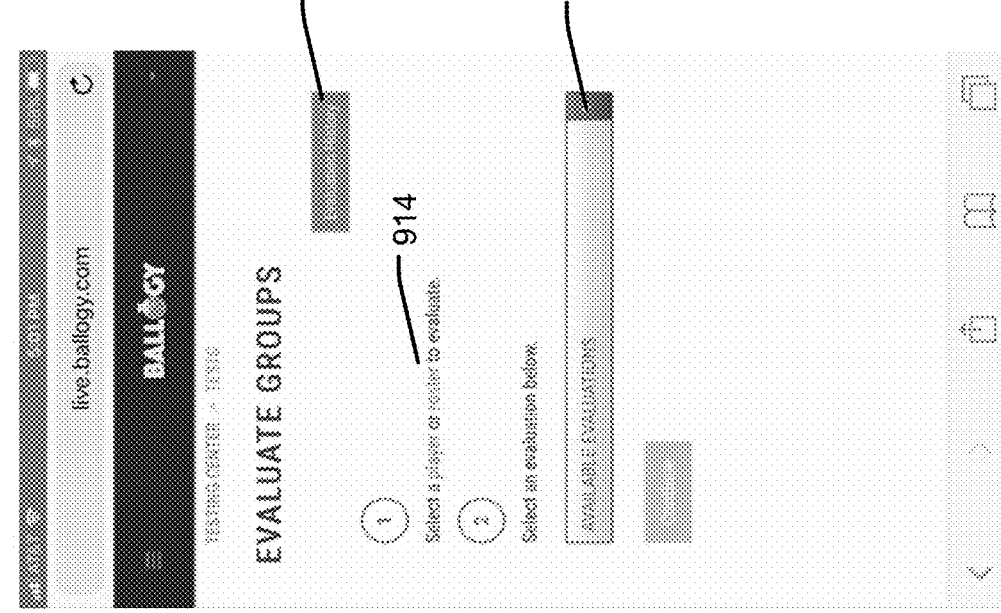

FIG. 9 illustrates another example of testing center GUIs of the sports social media application 128. A first testing center GUI 900 corresponds to an evaluate groups GUI and includes buttons or links to review, assign, and/or perform evaluations. As illustrated in the example of FIG. 9, the first testing center GUI 900 includes an evaluation history button 912, player and roster selection links 914, and an evaluation bar 916.

Responsive to a user activating the player selection link 914 and selecting a player, activating the roster selection link 914 and selecting a roster, activating the evaluations bar 916 and selecting an evaluation, or a combination thereof, the device 102 outputs a second testing center GUI 902. The second testing center GUI 902 corresponds to a selected group evaluation GUI and includes information about a current evaluation. As illustrated in the example of FIG. 9, the second testing center GUI 902 includes a group identifier 922, an evaluation identifier 924, a preview and share button 926, evaluation information 928, a rating slider bar 930, and a toggle switch 932.

Figure 10:
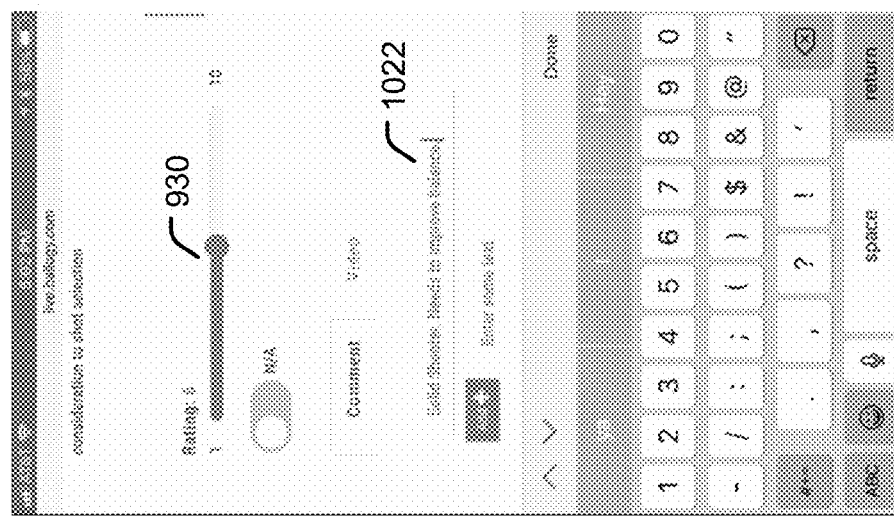
FIG. 10 is a diagram that illustrates examples of GUIs of a sports social media application.
Figure 10:
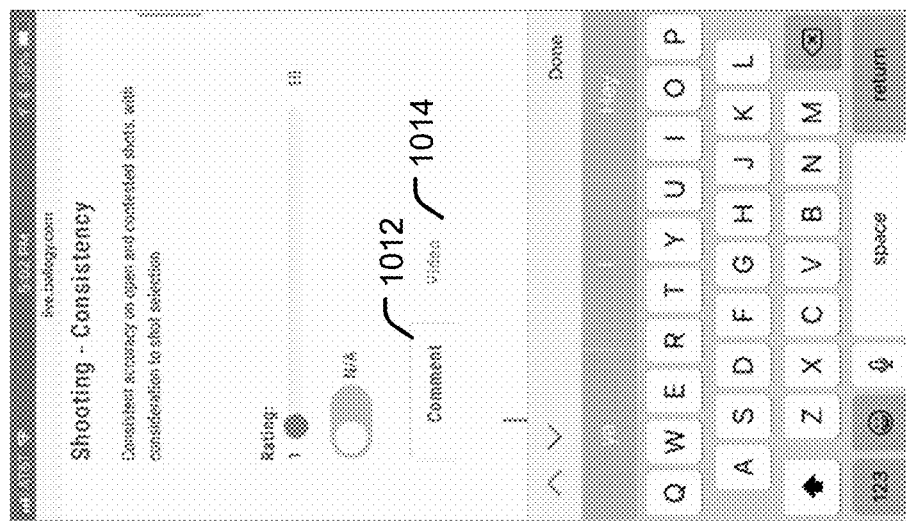

FIG. 10 illustrates examples of testing center GUIs of the sports social media application 128. A third testing center GUI 1000 corresponds to a selected groups GUI and includes fields to insert comments, video, or both. As illustrated in the example of FIG. 10, the third testing center GUI 1000 includes a comments tab 1012 and a video tab 1014. Upon selecting the comments tab 1012, the user can enter comments via text or speech. Upon selecting the video tab 1014, the user can select a stored video to attach, enter a link to a video hosted by another device, generate a video (e.g., initiate video capture by the camera 126 of FIG. 1), or a combination thereof.

A fourth testing center GUI 1002 corresponds to a selected groups GUI and illustrates an evaluation of a player. As illustrated in the example of FIG. 10, the user activated the rating slider bar 930 to a value of 6 and entered a comment 1022.

Figure 11:
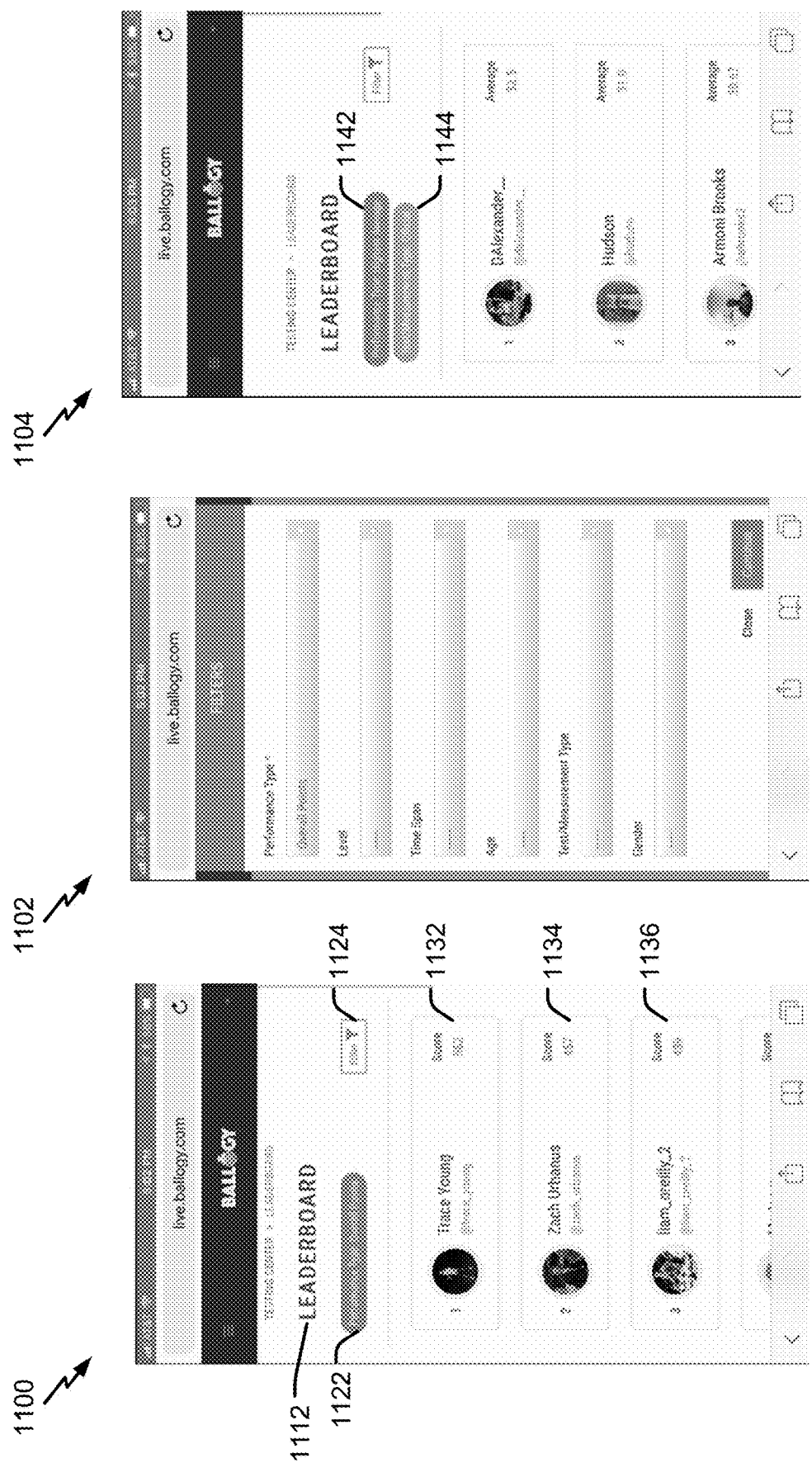
FIG. 11 is a diagram that illustrates examples of leaderboard GUIs of a sports social media application.

FIG. 11 illustrates examples of leaderboard GUIs of the sports social media application 128. A first leaderboard GUI 1100 corresponds to an overall points leaderboard 1112 and includes a first filter type 1122 (performance type: overall points), a filter button 1124, and multiple leader entries 1132-1136. Each leader entry 1132-1136 indicates a user and a score or rank. As illustrated in the example of FIG. 11, each leader entry 1132-1136 includes a rank number, a photo, a name, a username, and a score.

A second leaderboard GUI 1102 corresponds to a leaderboard filter popup and includes multiple leaderboard filter fields. As illustrated in the example of FIG. 11, the second leaderboard GUI 1102 includes a performance type field, a level field, a time span field, an age field, a test or measurement type field, and a gender field. The second leaderboard GUI 1102 is displayed responsive to user selection of the filter button 1124.

A third leaderboard GUI 1104 corresponds to a highest average leaderboard for official tests. As illustrated in the example of FIG. 11, the third leaderboard GUI 1104 includes two active filters 1142 (highest average) and 1144 (official tests). The leader entries of the third leaderboard GUI 1104 are similar to the leader entries 1132-1136 of the first leaderboard GUI 1100. In other implementations, the leaderboard GUIs 1100-1104 includes other information fields, more information fields, fewer information fields, or a combination thereof.

Figure 12:
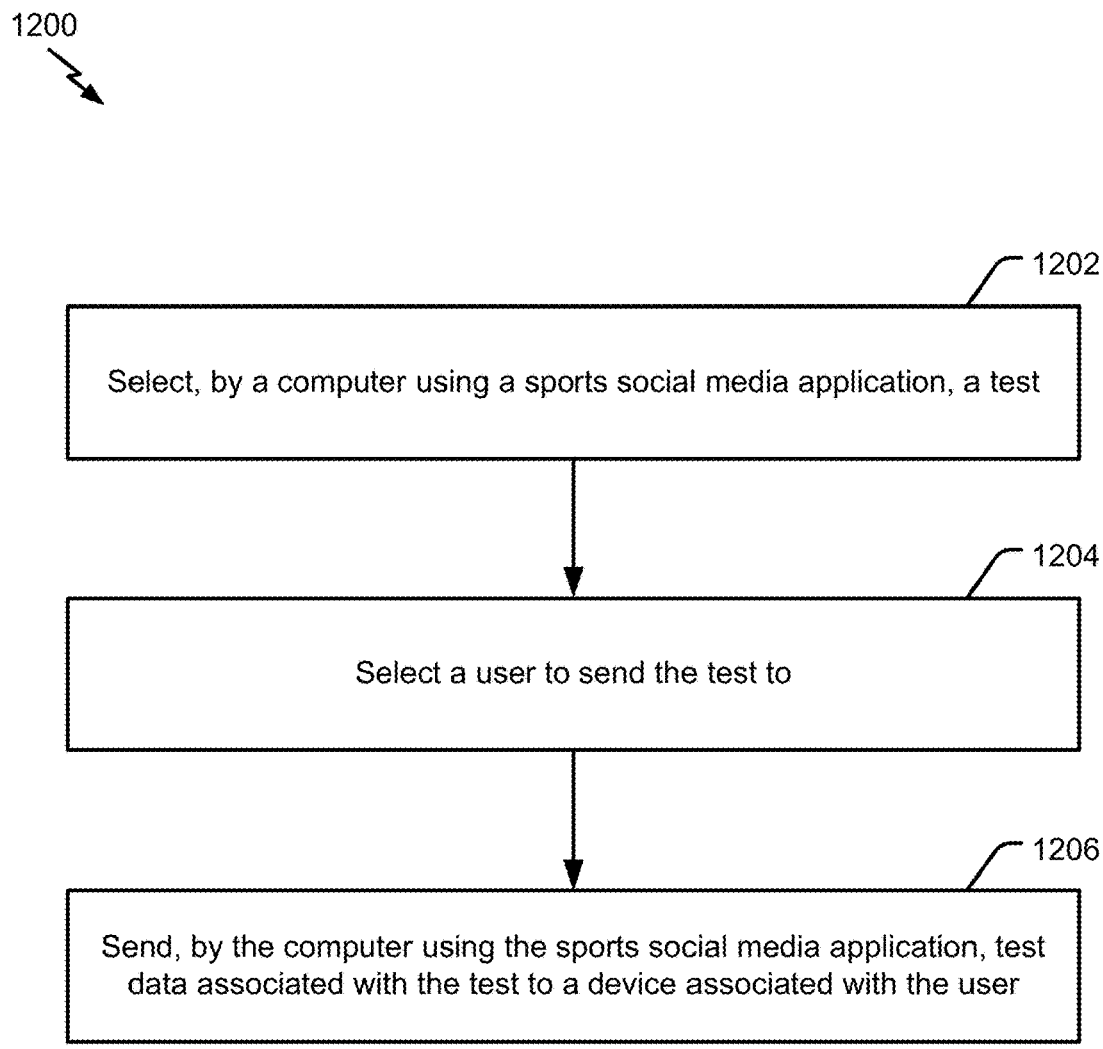
FIG. 12 is a flow chart of an example of a method of selecting and sending a test to a user.

FIG. 12 illustrates a particular example of a method 1200 of selecting and sending a test. The method 1200 may be performed by the system 100, the device 102, the first computer 104, the second computer 106, the third computer 108, the processor 112, or a combination thereof. The method 1200 includes, at 1202, selecting, by a computer using a sports social media application, a test. For example, the computer may include or correspond to the device 102, the second computer 106, or the third computer 108 of FIG. 1. The sports social media application may include or correspond to the sports social media application 128 of FIG. 1 or the sports social networking application 208 of FIG. 2, and the test may include or correspond to one or more of the tests described with reference to FIGS. 1 and 8. To illustrate, the processor 112 of the device 102 selects a test and corresponding test data 142 responsive to a user input, as described with reference to FIG. 1. In some implementations, the test includes a combine measurement, a running drill, a shooting drill, a throwing drill, a hitting drill, a passing drill, or a combination thereof. Alternatively, the processor 112 of the device 102 generates a custom test responsive to user inputs, as described with reference to FIG. 2.

The method 1200 also includes, at 1204, selecting a user to send the test to. For example, the user includes or corresponds to one or more of the users described with reference to FIGS. 1, 3, and 8. To illustrate, the processor 112 of the device 102 selects a player user for the selected test responsive to one or more user inputs, as described with reference to FIGS. 1 and 2. Although selecting a user is depicted as following selecting a test, the two steps can be performed in reverse order, i.e., selecting a test and then selecting a user.

The method 1200 includes, at 1206, sending, by the computer using the sports social media application, test data associated with the test to a device associated with the user. For example, the device associated with the user may include or correspond to the first computer 104, the second computer 106, or the third computer 108 of FIG. 1. To illustrate, the processor 112 of the device 102 sends the test data 142 via the network interface 118 using the sports social media application 128, as described with reference to FIGS. 1 and 2.

In some implementations, the method 1200 further includes prior to selecting the test, creating the test via a custom test builder module (e.g., a test builder application) of the sports social media application, as described with reference to FIG. 2. In a particular implementation, creating the test via the custom test builder module includes adding voice instructions, adding text instructions, or a combination thereof, to the test responsive to user inputs.

In some implementations, the method 1200 further includes receiving, by the computer using the sports social media application, test performance data from the device associated with the user or from a server, as described with reference to FIG. 1.

In some implementations, the method 1200 further includes generating forward projections based on the test performance data and aggregate data, as described with reference to FIGS. 1 and 2. For example, the analytics module 206 generates the forward projections by AI, recurrent neural network, Differential Free Optimization, or a combination thereof. As illustrative, non-limiting examples, the forward projections include expected points, goals, assists, rebounds, blocks, steals, runs scored, at-bats, strikes, outs, or a combination thereof. The aggregate data includes test performance data for other users. The aggregate data may be received by the device 102 from a server or stored locally on the device 102. The aggregate data may correspond to test results for players in which the user has no relationship with, players in which the user has on its roster or player list, or a combination thereof, as described with reference to FIG. 2.

In some implementations, the method 1200 further includes generating team forward projections based on the test performance data and aggregate data, as described with reference to FIG. 2. As illustrative, non-limiting examples, the team forward projections include expected wins, losses, win streaks, loss streaks, win percentage, opponent predictions, weather predictions, or a combination thereof. In some such implementations, the aggregate data includes open domain data (e.g., data outside of social media data, such as betting odds, weather, etc.).

In some implementations, selecting a user includes selecting a roster including the user and one or more other users. In some such implementations, the method 1200 further includes sending the test data to devices associated with the one or more other users, as described with reference to FIGS. 7 and 8.

In some implementations the method 1200 further includes, prior to selecting the user, searching for the user by username, name, affiliation (e.g., school and/or team), or a combination thereof, as described with reference to FIG. 3.

In some implementations the method 1200 further includes generating visuals (e.g., histogram, scatter plot, pie charts, etc.) based on the test performance data, forward projections, or both, as described with reference to FIG. 2.

Figure 13:
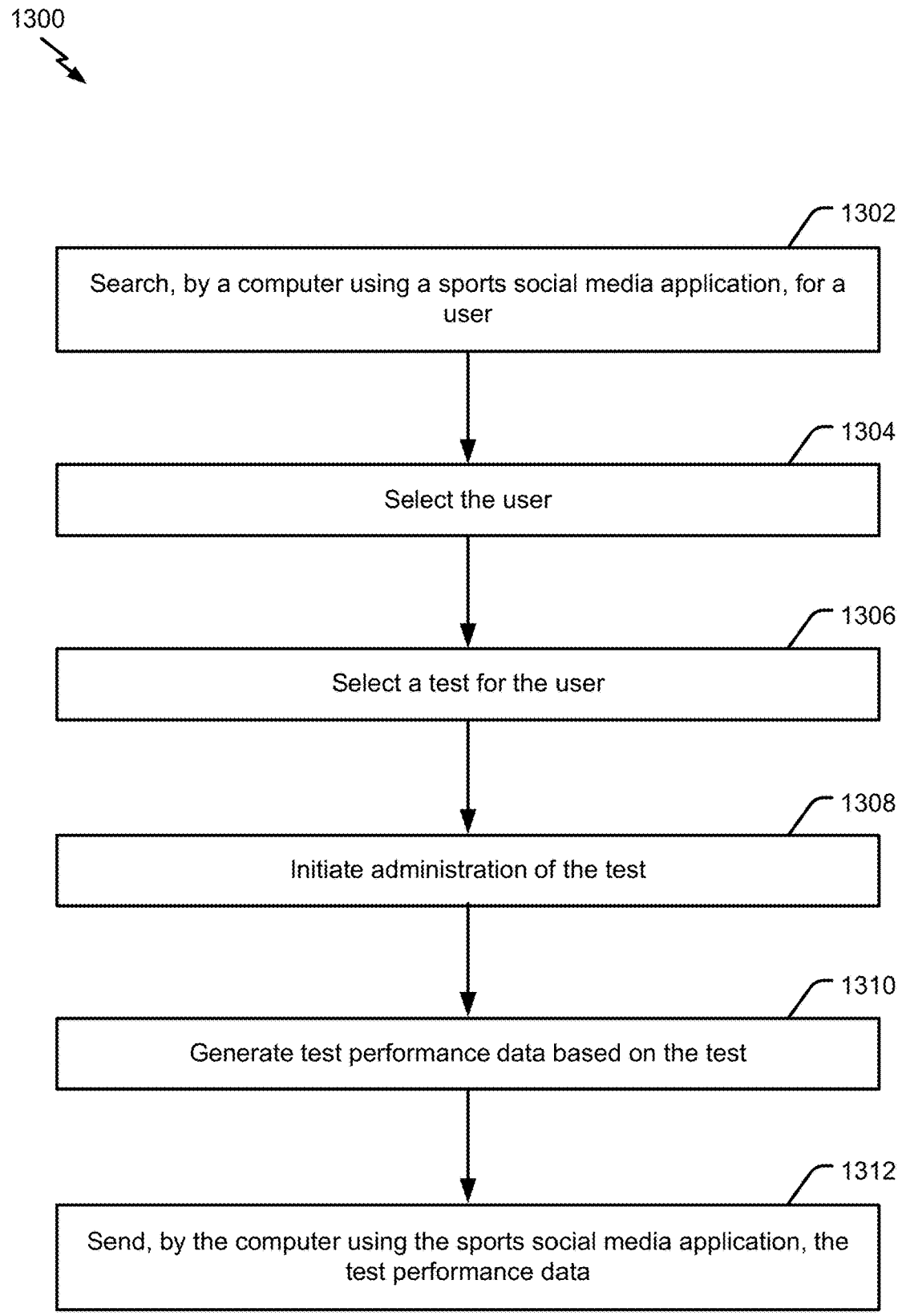
FIG. 13 is a flow chart of another example of a method of selecting and sending a test to a user.

FIG. 13 illustrates a particular example of a method 1300 of selecting and sending a test to a user. The method 1300 may be performed by the system 100, the device 102, the first computer 104, the second computer 106, the third computer 108, the processor 112, or a combination thereof. The method 1300 includes, at 1302, searching, by a computer using a sports social media application, for a user. For example, the computer may include or correspond to the device 102, the second computer 106, or the third computer 108 of FIG. 1. The sports social media application may include or correspond to the sports social media application 128 of FIG. 1 or the sports social networking application 208 of FIG. 2, and the user may include or correspond to one of the users or players described with reference to FIGS. 1, 3, and 8. To illustrate, the processor 112 of the device 102 searches for player responsive to user inputs, as described with reference to FIGS. 1, 3 and 8. In some implementations, the test includes a combine measurement, a running drill, a shooting drill, a throwing drill, a hitting drill, a passing drill, or a combination thereof.

The method 1300 includes, at 1304, selecting the user. For example, the processor 112 of the device 102 selects a player user from the search results or from a roster responsive to user inputs, as described with reference to FIGS. 1, 3 and 8. The method 1300 includes, at 1306, selecting a test for the user. For example, the test may include or correspond to one or more of the tests described with reference to FIGS. 1 and 8. To illustrate, the processor 112 of the device 102 searches for a test from a list of test and selects a test responsive to user inputs, as described with reference to FIGS. 1, 3 and 8. Alternatively, the processor 112 of the device 102 creates a custom test responsive to user inputs, as described with reference to FIG. 2.

The method 1300 includes, at 1308, initiating administration of the test. For example, the processor 112 of the device 102 starts the selected test, as described with reference to FIGS. 1, 3 and 8. The method 1300 includes, at 1310, generating test performance data based on the test. For example, the test performance data may include or correspond to the test performance data 144 or the official test performance data 182 of FIG. 1. To illustrate, the processor 112 of the device 102 generates the test performance data 144 based on user inputs, sensor data, video data, or a combination thereof, as described with reference to FIGS. 1, 3 and 8.

The method 1300 includes, at 1312, sending, by the computer using the sports social media application, the test performance data. For example, the processor 112 of the device 102 sends the test performance data 144 to one or more devices or computers, as described with reference to FIGS. 1, 3 and 8.

In some implementations, the method 1300 further includes generating, by the sports social media application, a second test, coaching tips, or both, based on the test performance data. For example, the processor 112 of the device 102 automatically or semi-automatically creates a custom test or selects a second test to for the player user based on the test performance data 144. To illustrate, the analytics module 206 determines that the player user is more proficient at corner three-point shots than straight on three-point shots, and the analytics module 206 instructs the test module 202 to generate a custom test to practice more straight-on three-point shots. As another example, the processor 112 of the device 102 automatically or semi-automatically selects a coaching tip from a list of coaching tips based on the test performance data 144. To illustrate, the analytics module 206 selects "a keep arm up on follow through" tip based the test performance data 144 and video data included therein.

In some implementations, the method 1300 further includes receiving notes into the sports social media application, capturing video and performing machine vision analysis on the video, indicating performance results via user inputs, or a combination thereof, during administration of the test. For example, the processor 112 of the device 102 generates note data responsive to user speech during the test. To illustrate, the voice-to-text converter 216 generates text data based on audio data of user speech. As another example, the camera 126 of the device captures video of the player user taking the test. In some implementations, the camera 126 captures the player user in the video, and in other implementations, the camera 126 captures the result only (e.g., is fixed on the basket and net rather than the player). The machine vision module 224 performs machine vision on the video to validate or certify the test performance data 144. As yet another example, the processor 112 of the device 102 generates the test performance data 144 responsive to user inputs. To illustrate, the user inputs player makes and misses via the make and miss buttons 528, 530 of the fifth testing center GUI 500 of FIG. 5.

In some implementations, sending the test performance data includes publishing the test performance data via the sports social media application. For example, the network interface 118 of the device 102 sends the test performance data 144 (e.g., public test result data) to the second computer 106 for publishing or associating with the player user. Additionally or alternatively, sending the test performance data includes sending the test performance data to a device associated with the user. For example, the network interface 118 of the device 102 sends the test performance data 144 (e.g., public or private test result data) to the first computer 104. To illustrate, the sports social media application 128 (or the sports social networking application 208 thereof) sends the test performance data 144, via the network interface 118, to the second computer 106 which forwards the test performance data 144 to the first computer 104.

Figure 14:
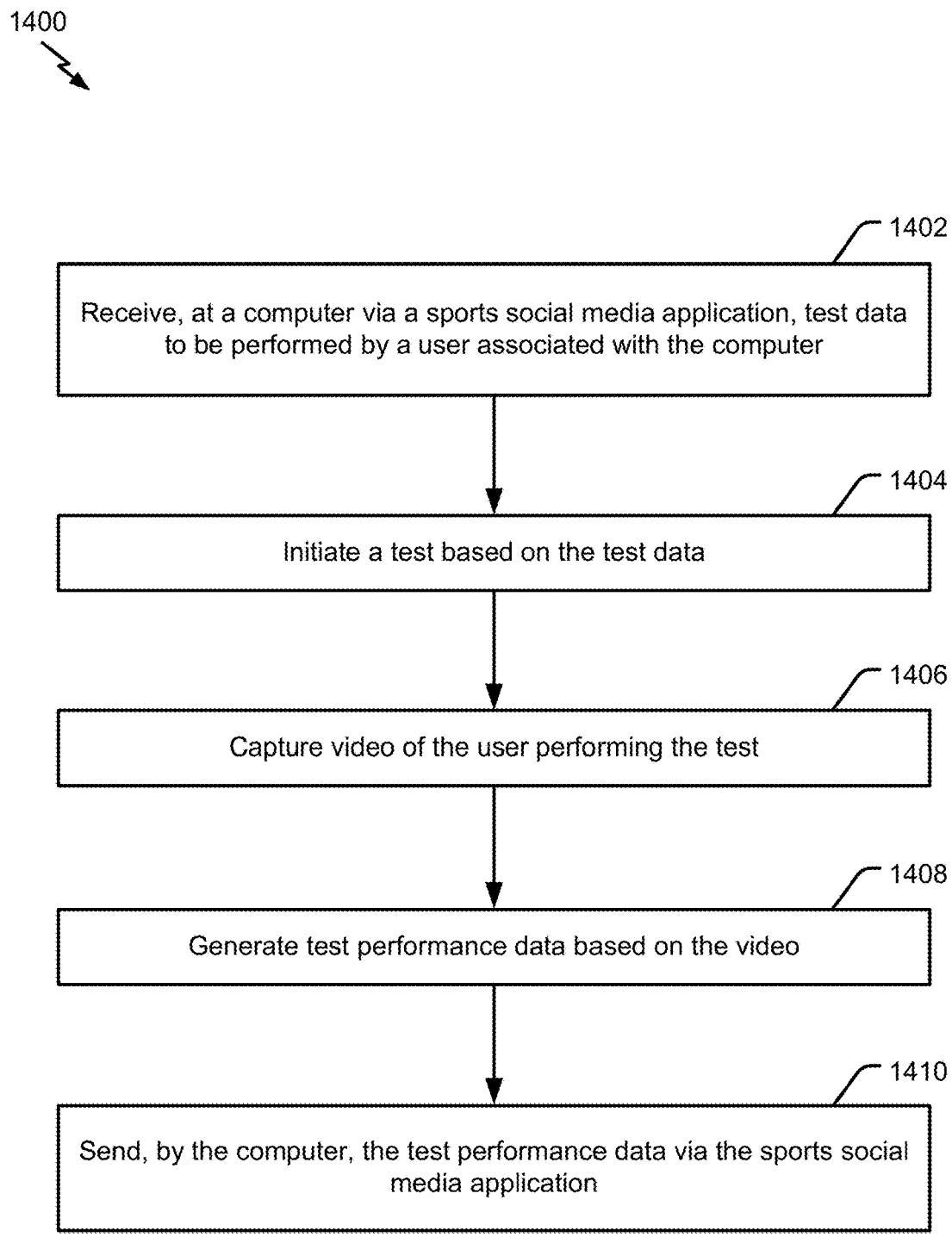
FIG. 14 is a flow chart of yet another example of a method of receiving and performing a test.

FIG. 14 illustrates a particular example of a method 1400 of receiving and performing a test. The method 1400 may be performed by the system 100, the device 102, the first computer 104, the third computer 108, the processor 112, or a combination thereof. The method 1400 includes, at 1402, receiving, at a computer via a sports social media application, test data to be performed by a user associated with the computer. For example, the computer may include or correspond to the device 102, the first computer 104, or the third computer 108 of FIG. 1. The sports social media application may include or correspond to the sports social media application 128 of FIG. 1 or the sports social networking application 208 of FIG. 2. The test data may include or correspond to the test data 142 of FIG. 1, and the user may include or correspond to one of the users or players described with reference to FIGS. 1, 3, and 8. To illustrate, the processor 112 of the device 102 receives test data indicating a particular test that was assigned to the user associated with the device, as described with reference to FIG. 1.

The method 1400 includes, at 1404, initiating a test based on the test data. For example, the test may include or correspond to the one or more of the tests described with reference to FIGS. 1 and 8. To illustrate, the processor 112 of the device 102 displays a test GUI, such as the fifth testing center GUI 500 of FIG. 5, responsive to user inputs (e.g., activating start button 512).

The method 1400 includes, at 1406, capturing video of the user performing the test. For example, the camera 126 of the device 102 captures video of the player performing the test and generates video data, as described with reference to FIGS. 1 and 2.

The method 1400 includes, at 1408, generating test performance data based on the video. For example, the test performance data may include or correspond to the test performance data 144 or the official test performance data 182 of FIG. 1. To illustrate, the machine vision module 224 performs machine vision on the video data to generate the test performance data 144. Additionally or alternatively, the user or another person inputs scores into the device 102 using the GUI, such as the fifth testing center GUI 500 of FIG. 5, and the machine vision module 224 validates or certifies the scores to generate certified or validated test performance data 144 by performing machine vision on the video data.

The method 1400 includes, at 1410, sending, by the computer, the test performance data via the sports social media application. For example, the network interface 118 of the device 102, the first computer 104, or the third computer 108, sends the test performance data 144 (e.g., public test result data) to the second computer 106 for publishing or associating with the player user. As another example, the network interface 118 of the first computer 104 or the third computer 108 sends the test performance data 144 (e.g., public or private test result data) to the device 102. To illustrate, the sports social media application 128 (or the sports social networking application 208 thereof) sends the test performance data 144, via the network interface 118, to the second computer 106 which forwards the test performance data 144 to the device 102.

In some implementations, the method 1400 further includes generating voice instructions based on the test data. For example, the text-to-voice converter 214 generates audio based on test of the test data 142, and the speakers 124 outputs the audio which includes instructions for taking the test.

In some implementations, the method 1400 further includes, responsive to receiving the test data, generating a notification, an entry in a feed of the sports social media application, or both. For example, the sports social networking application 208 updates the GUI to generate a notification or an entry in a feed, as described with reference to FIG. 1.

The methods 1200, 1300, and 1400 of FIGS. 12-14 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 1200 of FIG. 12 can be initiated or controlled by one or more processors, such as one or more processors included in a control system. In some implementations, a portion of one of the methods 1200, 1300, and 1400 of FIGS. 12-14 may be combined with a second portion of one of the methods 1200, 1300, and 1400 of FIGS. 12-14 and/or combined with one or more operations described with reference to FIGS. 1 and 2. Additionally, one or more operations described with reference to the methods 1200, 1300, and 1400 of FIGS. 12-14 may be optional and/or may be performed in a different order than shown or described. Two or more operations described with reference to the methods 1200, 1300, and 1400 of FIGS. 12-14 may be performed at least partially concurrently.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
   selecting, by a first computer using a sports social media application, a basketball-specific skill evaluation test from a set of basketball-specific skill evaluation tests preconfigured based on one or more fixed landmarks relating to a basketball court;
   selecting, in accordance with an input provided via the sports social media application by a first user of the sports social media application, one or more second users of the sports social media application to be evaluated with respect to one or more particular basketball-specific skills via the selected basketball-specific skill evaluation test;
   sending, by the first computer using the sports social media application, test data comprising one or more parameters identifying the selected basketball-specific skill evaluation test to one or more second devices associated with the one or more second users to prompt the one or more second devices to initiate, using the sports social media application at the one or more second devices, the selected basketball-specific skill evaluation test for the one or more second users; and
   generating, via one or more machine learning and/or artificial intelligence components, test performance data and forward projections of future performance for the one or more second users of the sports social media application using video data corresponding to captured video content of performance of the selected basketball-specific skill evaluation test captured by the one or more second devices.

2. The method of claim 1, further comprising, prior to selecting the basketball-specific skill evaluation test, creating the basketball-specific skill evaluation test via a custom basketball-specific test builder module of the sports social media application at the first computer.

3. The method of claim 1, wherein the one or more forward projections of future performance for the one or more second users of the sports social media application include expected points, goals, assists, rebounds, blocks, steals, or a combination thereof.

4. The method of claim 1, further comprising generating, at the first computer at least in part via the sports social media application, team forward projections based on the test performance data and further based on aggregate data from a plurality of other users.

5. The method of claim 4, wherein the team forward projections includes expected wins, losses, win streaks, loss streaks, win percentage, opponent predictions, weather predictions, and wherein the aggregate data includes open domain data.

6. The method of claim 1, further comprising receiving, by the first computer using the sports social media application, certified test performance data from a device associated with a testing center.

7. The method of claim 1, wherein selecting the one or more second users includes selecting a roster including at least each of the one or more second users.

8. The method of claim 1, further comprising, prior to selecting the one or more second users, searching, at the first computer at least in part via the sports social media application, for at least one user by username, name, affiliation, or a combination thereof.

9. The method of claim 1, further comprising generating, at the first computer at least in part via the sports social media application, one or more visual representations based at least in part on the test performance data, the forward projections, or both.

10. A method comprising:
    receiving, at one or more second devices from a first device, an indication of a selection of a basketball-specific skill evaluation test from a set of preconfigured basketball-specific skill evaluation tests for one or more second users selected from a plurality of users of a sports social media application at least in part in accordance with an input provided by a first user via the sports social media application at the first device, wherein the set of preconfigured basketball-specific skill evaluation tests are preconfigured based on one or more fixed landmarks relating to a basketball court;
    responsive at least in part to receiving the indication of the selection of the basketball-specific skill evaluation test, initiating administration of the selected basketball-specific skill evaluation test at least in part via the one or more second devices, wherein the one or more second devices are capable of capturing video content pertaining to performance of the selected basketball-specific skill evaluation test for the one or more second users;
    generating, via the sports social media application at the one or more second devices, test performance data based on the performance of the selected basketball-specific skill evaluation test for the one or more second users;

generating, via one or more machine-learning and/or artificial intelligence components, the test performance data and forward projections of future performance for the one or more second users using video data corresponding to video content of the performance of the selected basketball-specific skill evaluation test captured by the one or more second devices; and sending, at least in part via the sports social media application, the test performance data from the one or more second devices to the first device.

11. The method of claim 10, wherein the selected basketball-specific skill evaluation test includes a combine measurement, a running drill, a shooting drill, a throwing drill, a passing drill, or a combination thereof.

12. The method of claim 10, further comprising publishing the test performance data via the sports social media application to one or more additional devices of one or more additional users.

13. The method of claim 10, further comprising sending the test performance data to a server computing device.

14. A method comprising:
receiving, at a computer via a sports social media application, test data associated with a user associated with the computer, wherein the test data comprises one or more parameters identifying a particular basketball-specific skill evaluation test;
initiating, at the computer, administration of the particular basketball-specific skill evaluation test based on the test data and on one or more fixed landmarks relating to a basketball court;
capturing, by the computer, video content of the user performing the particular basketball-specific skill evaluation test;
generating, by one or more machine learning and/or artificial intelligence components, test performance data based on an evaluation of the video content;
sending, by the computer, the test performance data via the sports social media application to one or more other computing devices; and
generating, by the one or more machine learning and/or artificial intelligence components, forward projections of future performance for one or more users using video data corresponding to the video content of the user performing the particular basketball-specific skill evaluation test captured by the computer.

15. The method of claim 14, further comprising generating, by the computer, voice instructions based at least in part on the test data, wherein the test data is received from a first device and wherein the test performance data is sent to a second device at least in part via the sports social media application.

16. The method of claim 14, further comprising, responsive to receiving the test data, generating a notification, an entry in a feed of the sports social media application, or both.

17. A system comprising: a server;
a first device, coupled to the server via a network, that includes a first computer processor and a first computer memory, the first computer memory including first computer program instructions comprising one or more functions of a sports social media application that, when executed:
create a basketball-specific skill evaluation test based on one or more fixed landmarks relating to a basketball court, send, via the network, test data comprising one or more parameters identifying the basketball-specific skill evaluation test, receive, via the network, test performance data pertaining to the basketball-specific skill evaluation test, and generate forward projections of expected results based on the test performance data; and a second device, coupled to the server via the network, that includes a video camera, a second computer processor, and a second computer memory, the second computer memory including second computer program instructions comprising one or more second functions of the sports social media application that, when executed:
receive the basketball-specific skill evaluation test from the first device via the network, administer the basketball-specific skill evaluation test to one or more second users associated with the second device at least in part via the sports social media application, generate the test performance data —according to an evaluation by a one or more machine learning and/or artificial intelligence components used to generate the test performance data and the forward projections of expected results for the one or more second users corresponding to video content captured via the video camera, and send, via the sports social media application, the test performance data to the first device or the server, or a combination thereof, via the network.

18. A smartphone comprising:
a touchscreen display;
a camera;
one or more sensors;
a processor coupled to the touchscreen display, the camera, and the one or more sensors;
a memory; and
a sports social media application stored in the memory and executable by the processor, the sports social media application including:
a social networking application;
a basketball-specific skill evaluation test builder application to output a graphical representation of a basketball court, receive a graphical indicator with respect to one or more fixed landmarks relating to the basketball court, and generate a basketball-specific skill evaluation test responsive to receiving the graphical indicator; and
one or more machine learning and/or artificial intelligence components to generate test performance data and to generate forward projections of future performance for one or more users using video data corresponding to video content of one or more performances of the basketball-specific skill evaluation test captured by the camera.

* * * * *